(12) United States Patent
Mongeon

(10) Patent No.: US 8,004,729 B2
(45) Date of Patent: Aug. 23, 2011

(54) LOW COST ADJUSTMENT METHOD FOR PRINTING SYSTEMS

(75) Inventor: Michael C. Mongeon, Walworth, NY (US)

(73) Assignee: Xerox Corporation, Norwalk, CT (US)

( * ) Notice: Subject to any disclaimer, the term of this patent is extended or adjusted under 35 U.S.C. 154(b) by 1471 days.

(21) Appl. No.: 11/146,665

(22) Filed: Jun. 7, 2005

(65) Prior Publication Data

US 2006/0274334 A1 Dec. 7, 2006

(51) Int. Cl.
H04N 1/46 (2006.01)

(52) U.S. Cl. ........................................................ 358/504

(58) Field of Classification Search .................... 399/39, 399/40, 66, 149, 150, 232, 296, 297, 298
See application file for complete search history.

(56) References Cited

U.S. PATENT DOCUMENTS

| | | | |
|---|---|---|---|
| 4,256,401 A * | 3/1981 | Fujimura et al. ............... 399/138 |
| 4,534,642 A * | 8/1985 | Miura et al. .................... 399/138 |
| 4,579,446 A | 4/1986 | Fujino et al. |
| 4,587,532 A | 5/1986 | Asano |
| 4,836,119 A | 6/1989 | Siraco et al. |
| 5,004,222 A | 4/1991 | Dobashi |
| 5,028,960 A * | 7/1991 | Yasuda et al. ................... 399/60 |
| 5,080,340 A | 1/1992 | Hacknauer et al. |
| 5,095,342 A | 3/1992 | Farrell et al. |
| 5,159,395 A | 10/1992 | Farrell et al. |
| 5,164,776 A * | 11/1992 | Oresick et al. ................. 399/50 |
| 5,208,640 A | 5/1993 | Horie et al. |
| 5,212,560 A * | 5/1993 | Hattori et al. .................. 358/300 |
| 5,262,825 A * | 11/1993 | Nordeen et al. ................ 399/48 |
| 5,272,511 A | 12/1993 | Conrad et al. |
| 5,326,093 A | 7/1994 | Sollitt |
| 5,359,393 A * | 10/1994 | Folkins ........................... 399/50 |
| 5,435,544 A | 7/1995 | Mandel |
| 5,473,419 A | 12/1995 | Russel et al. |
| 5,489,969 A | 2/1996 | Soler et al. |
| 5,504,568 A | 4/1996 | Saraswat et al. |
| 5,508,826 A * | 4/1996 | Lloyd et al. .................... 358/501 |
| 5,510,896 A * | 4/1996 | Wafler ............................ 358/296 |
| 5,525,031 A | 6/1996 | Fox |
| 5,557,367 A | 9/1996 | Yang et al. |

(Continued)

FOREIGN PATENT DOCUMENTS

JP 11-075067 * 3/1999

OTHER PUBLICATIONS

Morgan, P.F., "Integration of Black Only and Color Printers", Xerox Disclosure Journal, vol. 16, No. 6, Nov./Dec. 1991, pp. 381-383.

(Continued)

*Primary Examiner* — Benny Tieu
*Assistant Examiner* — Jeremiah Bryar
(74) *Attorney, Agent, or Firm* — Fay Sharpe LLP

(57) ABSTRACT

A method of adjusting a printing system includes providing a printing system including a plurality of marking engines that include first, second and third actuators. The method includes setting each of the actuators of each marking engine to predetermined values, and generating a plurality of printed samples having a visually apparent background density using at least one of the marking engines. The method also includes evaluating the printed samples, and adjusting the first actuator of at least one marking engine based at least partially on the evaluation. A system is also disclosed.

22 Claims, 15 Drawing Sheets

U.S. PATENT DOCUMENTS

| | | | |
|---|---|---|---|
| 5,568,246 | A | 10/1996 | Keller et al. |
| 5,570,172 | A | 10/1996 | Acquaviva |
| 5,596,416 | A | 1/1997 | Barry et al. |
| 5,606,395 | A * | 2/1997 | Yang et al. ............... 399/81 |
| 5,629,762 | A | 5/1997 | Mahoney et al. |
| 5,710,968 | A | 1/1998 | Clark et al. |
| 5,777,656 | A * | 7/1998 | Henderson ............ 347/251 |
| 5,778,377 | A | 7/1998 | Marlin et al. |
| 5,884,910 | A | 3/1999 | Mandel |
| 5,995,721 | A | 11/1999 | Rourke et al. |
| 6,059,284 | A | 5/2000 | Wolf et al. |
| 6,125,248 | A | 9/2000 | Moser |
| 6,241,242 | B1 | 6/2001 | Munro |
| 6,297,886 | B1 | 10/2001 | Cornell |
| 6,337,958 | B1 * | 1/2002 | Stanich et al. ............ 399/49 |
| 6,341,773 | B1 | 1/2002 | Aprato et al. |
| 6,384,918 | B1 | 5/2002 | Hubble, III et al. |
| 6,450,711 | B1 | 9/2002 | Conrow |
| 6,476,376 | B1 | 11/2002 | Biegelsen et al. |
| 6,476,923 | B1 | 11/2002 | Cornell |
| 6,493,098 | B1 | 12/2002 | Cornell |
| 6,537,910 | B1 | 3/2003 | Burke et al. |
| 6,550,762 | B2 | 4/2003 | Stoll |
| 6,554,276 | B2 | 4/2003 | Jackson et al. |
| 6,577,925 | B1 | 6/2003 | Fromherz |
| 6,607,320 | B2 | 8/2003 | Bobrow et al. |
| 6,608,988 | B2 | 8/2003 | Conrow |
| 6,612,566 | B2 | 9/2003 | Stoll |
| 6,612,571 | B2 | 9/2003 | Rider |
| 6,621,576 | B2 | 9/2003 | Tandon et al. |
| 6,633,382 | B2 | 10/2003 | Hubble, III et al. |
| 6,639,669 | B2 | 10/2003 | Hubble, III et al. |
| 6,714,673 | B1 * | 3/2004 | Ohta ..................... 382/167 |
| 6,819,906 | B1 | 11/2004 | Herrmann et al. |
| 7,377,613 | B2 * | 5/2008 | Yamazaki et al. ............ 347/19 |
| 2001/0033755 | A1 * | 10/2001 | Ino et al. ................. 399/49 |
| 2002/0078012 | A1 | 6/2002 | Ryan et al. |
| 2002/0103559 | A1 | 8/2002 | Gartstein |
| 2003/0077095 | A1 | 4/2003 | Conrow |
| 2004/0085561 | A1 | 5/2004 | Fromherz |
| 2004/0085562 | A1 | 5/2004 | Fromherz |
| 2004/0088207 | A1 | 5/2004 | Fromherz |
| 2004/0150156 | A1 | 8/2004 | Fromherz et al. |
| 2004/0150158 | A1 | 8/2004 | Biegelsen et al. |
| 2004/0153983 | A1 | 8/2004 | McMillan |
| 2004/0216002 | A1 | 10/2004 | Fromherz et al. |
| 2004/0225391 | A1 | 11/2004 | Fromherz et al. |
| 2004/0225394 | A1 | 11/2004 | Fromherz et al. |
| 2004/0247365 | A1 | 12/2004 | Lofthus et al. |
| 2005/0190216 | A1 * | 9/2005 | Yamazaki et al. ............ 347/6 |

OTHER PUBLICATIONS

Desmond Fretz, "Cluster Printing Solution Announced", Today at Xerox (TAX), No. 1129, Aug. 3, 2001.
U.S. Appl. No. 10/761,522, filed Jan. 21, 2004, Mandel, et al.
U.S. Appl. No. 10/785,211, filed Feb. 24, 2004, Lofthus, et al.
U.S. Appl. No. 10/881,619, filed Jun. 30, 2004, Bobrow.
U.S. Appl. No. 10/917,676, filed Aug. 13, 2004, Lofthus, et al.
U.S. Appl. No. 10/917,768, filed Aug. 13, 2004, Lofthus, et al.
U.S. Appl. No. 10/924,106, filed Aug. 23, 2004, Lofthus, et al.
U.S. Appl. No. 10/924,113, filed Aug. 23, 2004, deJong, et al.
U.S. Appl. No. 10/924,458, filed Aug. 23, 2004, Lofthus, et al.
U.S. Appl. No. 10/924,459, filed Aug. 23, 2004, Mandel, et al.
U.S. Appl. No. 10/933,556, filed Sep. 3, 2004, Spencer, et al.
U.S. Appl. No. 10/953,953, filed Sep. 29, 2004, Radulski, et al.
U.S. Appl. No. 10/999,326, filed Nov. 30, 2004, Grace, et al.
U.S. Appl. No. 10/999,450, filed Nov. 30, 2004, Lofthus, et al.
U.S. appl. No. 11/000,158, filed Nov. 30, 2004, Roof.
U.S. Appl. No. 11/000,168, filed Nov. 30, 2004, Biegelsen, et al.
U.S. Appl. No. 11/000,258, field Nov. 30, 2004, Roof.
U.S. Appl. No. 11/001,890, filed Dec. 2, 2004, Lofthus, et al.
U.S. Appl. No. 11/002,528, filed Dec. 2, 2004, Lofthus, et al.
U.S. Appl. No. 11/051,817, filed Feb. 4, 2005, Moore, et al.
U.S. Appl. No. 11/070,681, filed Mar. 2, 2005, Viturro, et al.
U.S. Appl. No. 11/081,473, filed Mar. 16, 2005, Moore.
U.S. Appl. No. 11/069,020, filed Feb. 28, 2005, Lofthus, et al.
U.S. Appl. No.11/089,854, filed Mar. 25, 2005, Clark, et al.
U.S. Appl. No. 11/090,498, filed Mar. 25, 2005, Clark.
U.S. Appl. No. 11/090,502, filed Mar. 25, 2005, Mongeon.
U.S. Appl. No.11/095,378, filed Mar. 31, 2005, Moore, et al.
U.S. Appl. No. 11/094,998, filed Mar. 31, 2005, Moore, et al.
U.S. Appl. No. 11/094,864, filed Mar. 31, 2005, de Jong, et al.
U.S. Appl. No. 11/095,872, filed Mar. 31, 2005, Julien, et al.
U.S. Appl. No. 11/102,355, filed Apr. 8, 2005, Fromherz, et al.
U.S. Appl. No. 11/084,280, filed Mar. 18, 2005, Mizes.
U.S. Appl. No. 11/109,566, field Apr. 19, 2005, Mandel, et al.
U.S. Appl. No. 11/109,558, filed Apr. 19, 2005, Furst, et al.
U.S. Appl. No. 11/109,996, filed Apr. 20, 2005, Mongeon, et al.
U.S. Appl. No. 11/093,229, filed Mar. 29, 2005, Julien.
U.S. Appl. No. 11/102,899, filed Apr. 8, 2005, Crawford, et al.
U.S. Appl. No. 11/102,910, filed Apr. 8, 2005, Crawford, et al.
U.S. Appl. No. 11/115,766, filed Apr. 27, 2005, Grace.
U.S. Appl. No. 11/102,332, filed Apr. 8, 2005, Hindi, et al.
U.S. Appl. No. 11/136,959, filed May 25, 2005, German, et al.
U.S. Appl. No. 11/136,821, filed May 25, 2005, Robinson.
U.S. Appl. No. 11/122,420, filed May 5, 2005, Richards.
U.S. Appl. No. 11/137,634, filed May 25, 2005, Lofthus, et al.
U.S. Appl. No. 11/137,251, filed May 25, 2005, Lofthus, et al.

* cited by examiner

LOW COST ADJUSTMENT METHOD FOR PRINTING SYSTEMS

BACKGROUND

Illustrated herein are embodiments for adjusting output characteristics, such as image quality, uniformity and consistency, in printing systems. Embodiments will be described with specific reference to systems having multiple xerographic or electrophotographic marking engines. However, it is to be understood that the embodiments are capable of broad use in association with a wide variety of printing or other rendering systems and technologies, and that such use is contemplated herein.

Printing systems have been developed that include multiple marking engines which are interconnected between a media supply and a media output by a plurality of pathways. Exemplary systems are shown in one or more of the below cross-referenced applications, such as U.S. application Ser. Nos. 10/917,768; 10/924,106; 10/924,459; and 11/051,817, for example. Such systems provide numerous benefits and advantages over other known printing systems, including increased performance or output rates and improved reliability. These benefits and advantages can be at least partly attributed to the ability of these systems to use multiple marking engines in the production of any one document. Said differently, these systems are capable of printing some pages or sides of sheets of a document using one marking engine and other pages or sides of sheets using one or more other, different marking engines. Thus, advantages in performance and reliability can be attained.

It will be recognized, though, that it is desirable for the documents produced by such multi-engine marking systems to maintain the high level of document quality, and image uniformity and consistency expected of other printing and/or marking systems. Additionally, it will be recognized that each marking engine operates within a nominal operating window that includes many factors and variables, which in turn influence the images output by the marking engine. As such, it could be possible for two or more marking engines to each be operable within the established operating window for that respective marking engine and yet produce printed images having observably different image qualities and characteristics when the printed images are compared side-by-side. For example, it would be undesirable to produce a document having sheets with different appearances, and could be particularly problematic where the pages are adjacent one another, such as on facing pages of a document printed in duplex.

An observably different appearance from one page or sheet to the next can result from even minor variations in image qualities and characteristics such as, but not limited to, overall image lightness, overall image darkness, image contrast, image line weight, shadow detail, solid area differences and a wide variety of other image conditions. Most image qualities and characteristics are attributable to or can be otherwise associated with specific operating conditions or actuator settings of a marking engine. By adjusting one or more of the operating conditions, actuator settings and/or other parameters of the specific marking engine, it is often possible to adjust one or more of the corresponding output conditions toward an optimal or otherwise predetermined setpoint.

In systems having multiple marking engines it is usually possible to use regular process controls to adjust at least some engine conditions and parameters. This helps to maintain the output and operation of each printing or marking engine within its nominal operating window. Additionally, systems have been developed that are operable to minimize overall system variability by coordinating the adjustments made to the operating conditions, actuator settings and/or other parameters of multiple engines toward optimal or otherwise predetermined setpoints. Thus, each engine is adjusted to be within its own output specification and also toward coordinated setpoints to thereby generate an improved overall system response. Exemplary systems are disclosed in one or more of the below cross-referenced applications, such as U.S. application Ser. No. 10/999,326 (the '326 application), for example.

It will be appreciated, however, that due to the number of actuators, conditions (both static and dynamic) and other variables, it is generally not practical to provide for adjustment of a large number of image characteristics and output conditions. Providing for such a large number of adjustments would likely significantly increase the number of components and the overall complexity of the system, as well as the attendant increase in costs associated therewith. Thus, systems are normally developed that are adapted to monitor and/or adjust those engine conditions, actuators and/or parameters that tend to have a more significant impact on engine outputs, such as quality or consistency, or that tend to fall out of adjustment more frequently. Image qualities and output conditions due to or associated with other unmonitored engine conditions are often left to be accommodated for by the regular process controls.

As an example, the cleaning field boundary is normally associated with output conditions such as line width. Applicant has recognized that marking engines running at different cleaning field boundaries could output images having different highlight density, and that such an occurrence could undesirably result in images having observably different appearances. As discussed above, such a variation in output conditions could be particularly problematic where different pages or sheets of a single document are produced by different marking engines of a multiple marking engine system. To date, however, the regular process controls of printing systems having multiple marking engines have not been adapted to include cleaning field boundary adjustments. Thus, any variations in image quality and/or output characteristics that can be attributed to differences in the cleaning field boundaries of the multiple marking engines have been left to be resolved by the regular process controls without performing any adjustment to the cleaning field boundaries. This, however, tends to cause the regular process controls to operate at or near the limits for making such corrections and adjustments.

In printing systems having a single marking engine, regular process controls can be used to adjust engine conditions and parameters, including the cleaning field boundary. However, a densitometer, such as a black toner area coverage (BTAC) sensor, or other suitable hardware is normally used in association with an attendant control loop to perform adjustments to the cleaning field. Using these and/or other sensors and the associated control loops is an effective approach to adjusting the cleaning field of a marking engine. However, these sensors and associated controls are undesirably associated with increased physical space requirements, system complexity, and production and maintenance costs. Implementing such an arrangement in printing systems having multiple marking engines is generally undesirable as this further increases these factors. That is, additional print engines would utilize more sensor hardware and wiring as each print engine should include its own sensors. This would tend to undesirably increase system complexity and the overall costs associated therewith.

CROSS REFERENCE TO RELATED PATENTS AND APPLICATIONS

The following applications, the disclosures of each being totally incorporated herein by reference are mentioned:

U.S. Provisional Application Ser. No. 60/631,651, filed Nov. 30, 2004, entitled "TIGHTLY INTEGRATED PARALLEL PRINTING ARCHITECTURE MAKING USE OF COMBINED COLOR AND MONOCHROME ENGINES," by David G. Anderson, et al.;

U.S. Provisional Patent Application Ser. No. 60/631,918, filed Nov. 30, 2004, entitled "PRINTING SYSTEM WITH MULTIPLE OPERATIONS FOR FINAL APPEARANCE AND PERMANENCE," by David G. Anderson et al.;

U.S. Provisional Patent Application Ser. No. 60/631,921, filed Nov. 30, 2004, entitled "PRINTING SYSTEM WITH MULTIPLE OPERATIONS FOR FINAL APPEARANCE AND PERMANENCE," by David G. Anderson et al.;

U.S. application Ser. No. 10/761,522, filed Jan. 21, 2004, entitled "HIGH RATE PRINT MERGING AND FINISHING SYSTEM FOR PARALLEL PRINTING," by Barry P. Mandel, et al.;

U.S. application Ser. No. 10/785,211, filed Feb. 24, 2004, entitled "UNIVERSAL FLEXIBLE PLURAL PRINTER TO PLURAL FINISHER SHEET INTEGRATION SYSTEM," by Robert M. Lofthus, et al., U.S. application Ser. No. 10/881,619, filed Jun. 30, 2004, entitled "FLEXIBLE PAPER PATH USING MULTIDIRECTIONAL PATH MODULES," by Daniel G. Bobrow.;

U.S. application Ser. No. 10/917,676, filed Aug. 13, 2004, entitled "MULTIPLE OBJECT SOURCES CONTROLLED AND/OR SELECTED BASED ON A COMMON SENSOR," by Robert M. Lofthus, et al.

U.S. application Ser. No. 10/917,768, filed Aug. 13, 2004, entitled "PARALLEL PRINTING ARCHITECTURE CONSISTING OF CONTAINERIZED IMAGE MARKING ENGINES AND MEDIA FEEDER MODULES," by Robert M. Lofthus, et al.;

U.S. application Ser. No. 10/924,106, filed Aug. 23, 2004, entitled "PRINTING SYSTEM WITH HORIZONTAL HIGHWAY AND SINGLE PASS DUPLEX," by Lofthus, et al.;

U.S. application Ser. No. 10/924,113, filed Aug. 23, 2004, entitled "PRINTING SYSTEM WITH INVERTER DISPOSED FOR MEDIA VELOCITY BUFFERING AND REGISTRATION," by Joannes N. M. deJong, et al.;

U.S. application Ser. No. 10/924,458, filed Aug. 23, 2004, entitled "PRINT SEQUENCE SCHEDULING FOR RELIABILITY," by Robert M. Lofthus, et al.;

U.S. application Ser. No. 10/924,459, filed Aug. 23, 2004, entitled "PARALLEL PRINTING ARCHITECTURE USING IMAGE MARKING ENGINE MODULES (as amended)," by Barry P. Mandel, et al;

U.S. application Ser. No. 10/933,556, filed Sep. 3, 2004, entitled "SUBSTRATE INVERTER SYSTEMS AND METHODS," by Stan A. Spencer, et al.;

U.S. application Ser. No. 10/953,953, filed Sep. 29, 2004, entitled "CUSTOMIZED SET POINT CONTROL FOR OUTPUT STABILITY IN A TIPP ARCHITECTURE," by Charles A. Radulski et al., U.S. application Ser. No. 10/999,326, filed Nov. 30, 2004, entitled "SEMI-AUTOMATIC IMAGE QUALITY ADJUSTMENT FOR MULTIPLE MARKING ENGINE SYSTEMS," by Robert E. Grace, et al.;

U.S. application Ser. No. 10/999,450, filed Nov. 30, 2004, entitled "ADDRESSABLE FUSING FOR AN INTEGRATED PRINTING SYSTEM," by Robert M. Lofthus, et al.;

U.S. application Ser. No. 11/000,158, filed Nov. 30, 2004, entitled "GLOSSING SYSTEM FOR USE IN A TIPP ARCHITECTURE," by Bryan J. Roof;

U.S. application Ser. No. 11/000,168, filed Nov. 30, 2004, entitled "ADDRESSABLE FUSING AND HEATING METHODS AND APPARATUS," by David K. Biegelsen, et al.;

U.S. application Ser. No. 11/000,258, filed Nov. 30, 2004, entitled "GLOSSING SYSTEM FOR USE IN A TIPP ARCHITECTURE," by Bryan J. Roof;

U.S. application Ser. No. 11/001,890, filed Dec. 2, 2004, entitled "HIGH RATE PRINT MERGING AND FINISHING SYSTEM FOR PARALLEL PRINTING," by Robert M. Lofthus, et al.;

U.S. application Ser. No. 11/002,528, filed Dec. 2, 2004, entitled "HIGH RATE PRINT MERGING AND FINISHING SYSTEM FOR PARALLEL PRINTING," by Robert M. Lofthus, et al.;

U.S. application Ser. No. 11/051,817, filed Feb. 4, 2005, entitled "PRINTING SYSTEMS," by Steven R. Moore, et al., U.S. application Ser. No. 11/069,020, filed Feb. 28, 2004, entitled "PRINTING SYSTEMS," by Robert M. Lofthus, et al.;

U.S. application Ser. No. 11/070,681, filed Mar. 2, 2005, entitled "GRAY BALANCE FOR A PRINTING SYSTEM OF MULTIPLE MARKING ENGINES," by R. Enrique Viturro, et al.;

U.S. application Ser. No. 11/081,473, filed Mar. 16, 2005, entitled "PRINTING SYSTEM," by Steven R. Moore;

U.S. application Ser. No. 11/084,280, filed Mar. 18, 2005, entitled "SYSTEMS AND METHODS FOR MEASURING UNIFORMITY IN IMAGES," by Howard Mizes;

U.S. application Ser. No. 11/089,854, filed Mar. 25, 2005, entitled "SHEET REGISTRATION WITHIN A MEDIA INVERTER," by Robert A. Clark et al.;

U.S. application Ser. No. 11/090,498, filed Mar. 25, 2005, entitled "INVERTER WITH RETURN/BYPASS PAPER PATH," by Robert A. Clark;

U.S. application Ser. No. 11/090,502, filed Mar. 25, 2005, entitled "IMAGE QUALITY CONTROL METHOD AND APPARATUS FOR MULTIPLE MARKING ENGINE SYSTEMS," by Michael C. Mongeon;

U.S. application Ser. No. 11/093,229, filed Mar. 29, 2005, entitled "PRINTING SYSTEM," by Paul C. Julien;

U.S. application Ser. No. 11/095,872, filed Mar. 31, 2005, entitled "PRINTING SYSTEM," by Paul C. Julien;

U.S. application Ser. No. 11/094,864, filed Mar. 31, 2005, entitled "PRINTING SYSTEM," by Jeremy C. deJong, et al.;

U.S. application Ser. No. 11/095,378, filed Mar. 31, 2005, entitled "IMAGE ON PAPER REGISTRATION ALIGNMENT," by Steven R. Moore, et al.;

U.S. application Ser. No. 11/094,998, filed Mar. 31, 2005, entitled "PARALLEL PRINTING ARCHITECTURE WITH PARALLEL HORIZONTAL PRINTING MODULES," by Steven R. Moore, et al.;

U.S. application Ser. No. 11/102,899, filed Apr. 8, 2005, entitled "SYNCHRONIZATION IN A DISTRIBUTED SYSTEM," by Lara S. Crawford, et al.;

U.S. application Ser. No. 11/102,910, filed Apr. 8, 2005, entitled "COORDINATION IN A DISTRIBUTED SYSTEM," by Lara S. Crawford, et al.;

U.S. application Ser. No. 11/102,355, filed Apr. 8, 2005, entitled "COMMUNICATION IN A DISTRIBUTED SYSTEM," by Markus P. J. Fromherz, et al.;

U.S. application Ser. No. 11/102,332, filed Apr. 8, 2005, entitled "ON-THE-FLY STATE SYNCHRONIZATION IN A DISTRIBUTED SYSTEM," by Haitham A. Hindi;

U.S. application Ser. No. 11/109,558, filed Apr. 19, 2005, entitled "SYSTEMS AND METHODS FOR REDUCING IMAGE REGISTRATION ERRORS," by Michael R. Furst et al.;

U.S. application Ser. No. 11/109,566, filed Apr. 19, 2005, entitled "MEDIA TRANSPORT SYSTEM," by Mandel et al.;

U.S. application Ser. No. 11/109,996, filed Apr. 20, 2005, entitled "PRINTING SYSTEMS," by Mongeon et al.;

U.S. application Ser. No. 11/115,766, Filed Apr. 27, 2005, entitled "IMAGE QUALITY ADJUSTMENT METHOD AND SYSTEM," by Robert E. Grace;

U.S. application Ser. No. 11/122,420, filed May 5, 2005, entitled "PRINTING SYSTEM AND SCHEDULING METHOD," by Austin L. Richards;

U.S. application Ser. No. 11/136,821, filed May 25, 2005, entitled "AUTOMATED PROMOTION OF MONOCHROME JOBS FOR HLC PRODUCTION PRINTERS," by David C. Robinson;

U.S. application Ser. No. 11/136,959, filed May 25, 2005, entitled "PRINTING SYSTEMS", by Kristine A. German et al., U.S. application Ser. No. 11/137.634, filed May 25, 2005, entitled "PRINTING SYSTEM", by Robert M. Lofthus et al.;

U.S. application Ser. No. 11/137,251, filed May 25, 2005, entitled "SCHEDULING SYSTEM", by Robert M. Lofthus et al.; and U.S. C-I-P application Ser. No. 11/137,273, filed May 25, 2005, entitled "PRINTING SYSTEM", by David G. Anderson et al.

BRIEF DESCRIPTION

The present disclosure includes an exemplary embodiment of a method of adjusting a printing system. The embodiment includes providing a printing system that includes a plurality of marking engines each including first, second and third marking engine actuators. The embodiment also includes setting each of the first, second and third marking engine actuators of each marking engine of the plurality of marking engines to respective predetermined values. The embodiment further includes generating a plurality of printed samples having a background density using at least one marking engine of the plurality of marking engines, and evaluating the plurality of printed samples. The embodiment also includes adjusting the first actuator of at least one of the marking engines of the plurality of marking engines based at least partially on the evaluation of the printed samples.

The present disclosure includes another exemplary embodiment of a method of adjusting a printing system. The embodiment includes initiating an adjustment of a printing system including first and second marking engines, with each of the first and second marking engines including a charging grid level, a developer bias level, an exposure level and a cleaning field. The embodiment also includes setting the charging grid level, the developer bias level and the exposure level to respective predetermined values for each of the first and second marking engines. The embodiment further includes generating a print sample having a background development level using the first and second marking engines, and evaluating the print samples from the first and second marking engines based at least partially on the background development level. The embodiment also includes adjusting at least the charging grid level of at least one of the first and second marking engines based at least partially on the evaluation.

The present disclosure includes a further exemplary embodiment of a method of adjusting a printing system. The embodiment includes initiating an adjustment of a printing system that includes a first marking engine and a second marking engine. The first marking engine includes a first charging level, a first developer bias level, a first exposure level and a first cleaning field. The second marking engine includes a second charging level, a second developer bias level, a second exposure level and a second cleaning field. The embodiment also includes setting the charging grid level, the developer bias level and the exposure level of each of the first and second marking engines to predetermined setpoints. The embodiment further includes generating a printed sample using each of the first and second marking engines set at the predetermined setpoints, with the printed samples each including a background density. The embodiment also includes evaluating each of the printed samples, and adjusting at least one of the first and second cleaning fields such that the first and second cleaning fields are substantially equal.

DETAILED DESCRIPTION

Figure 1:
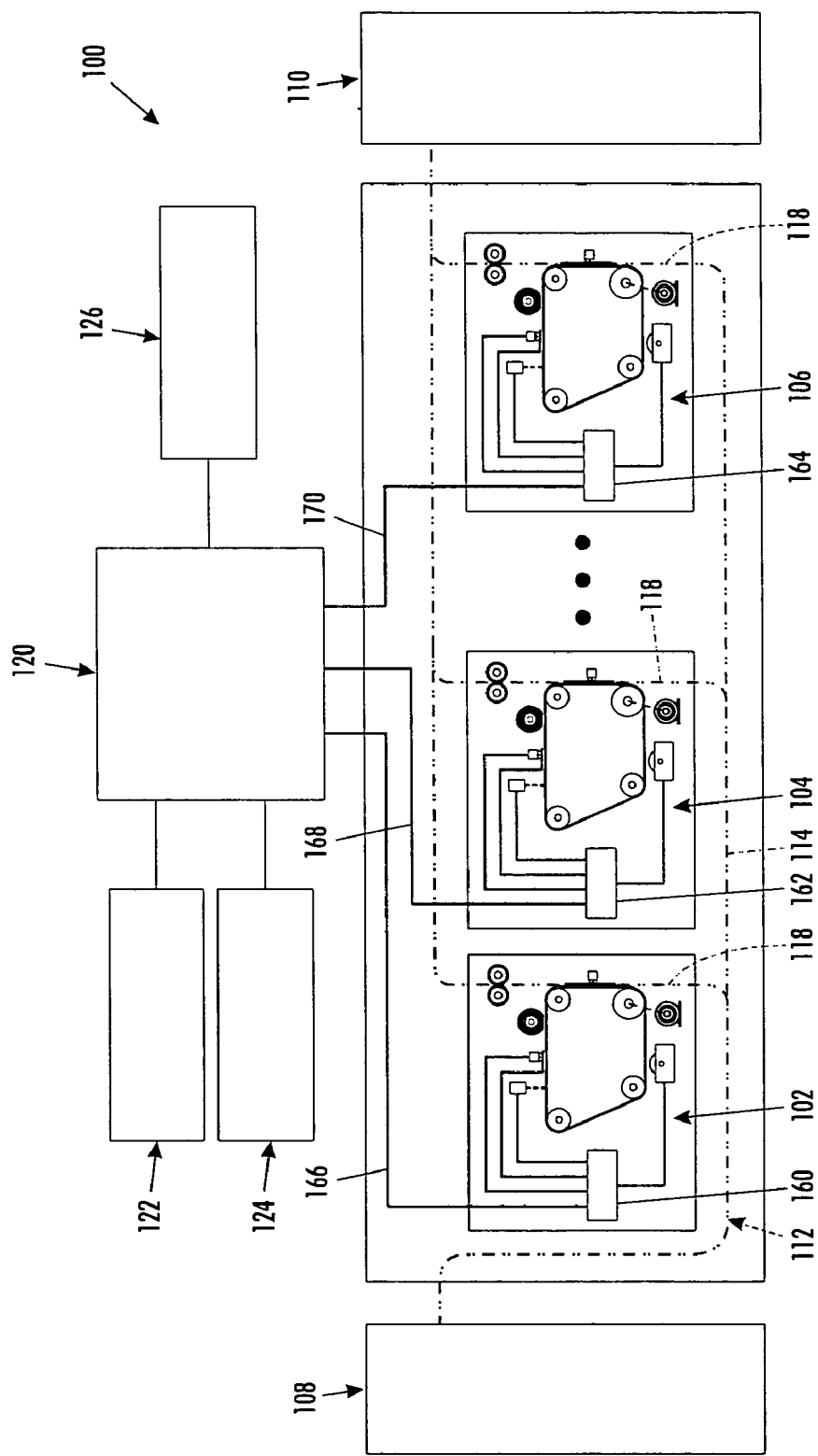
FIG. 1 is a schematic illustration of a printing system having multiple marking engines.
Figure 2:
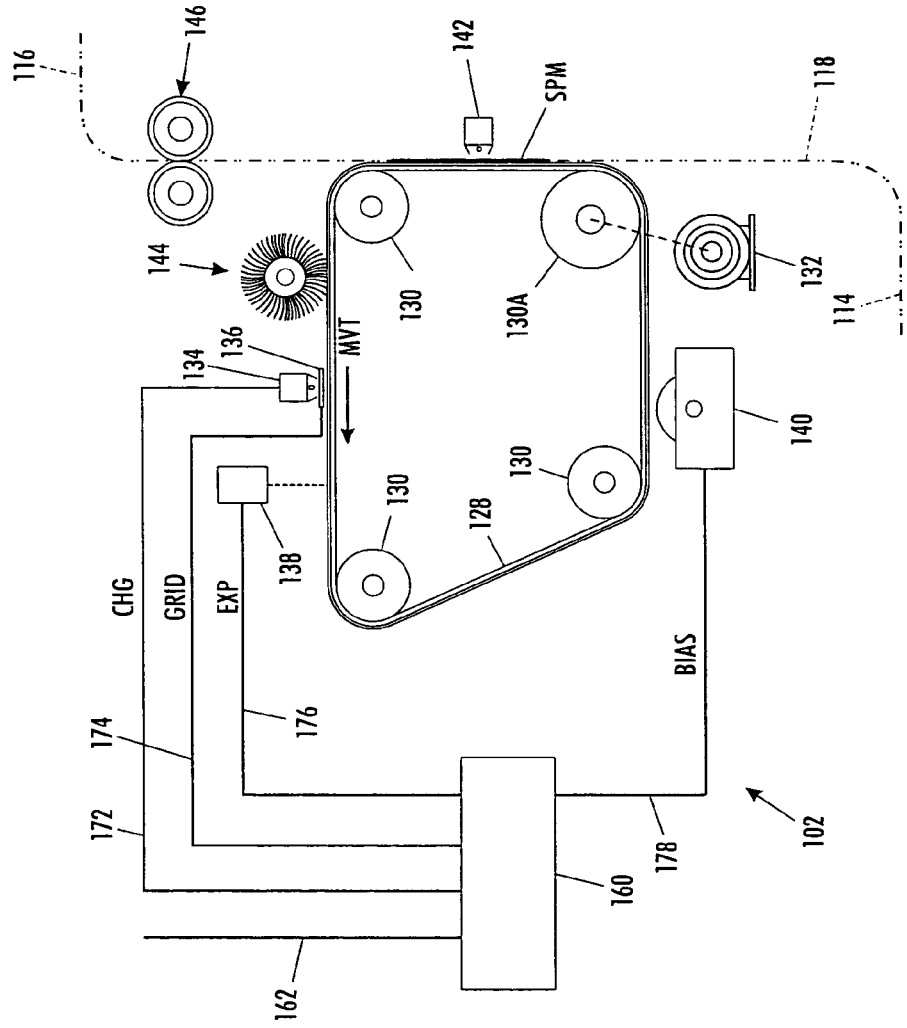
FIG. 2 is an enlarged schematic illustration of a marking engine in FIG. 1.

FIGS. 1 and 2 illustrate a printing system 100 having multiple marking engines, such as marking engines 102, 104 and 106, for example. A media supply 108 is disposed toward one end of the system and a media output 110 is disposed toward the opposing end of the system. Marking engines 102, 104 and 106 are interconnected by a media pathway 112 that includes a lower highway 114, an upper highway 116, and marking paths 118 associated with marking engines 102, 104 and 106 and extending between highways 114 and 116. Lower highway 114 receives blank media from media supply 108 and selectively delivers the blank media to the marking engines along marking paths 118. Upper highway 116 receives the printed or otherwise marked media from the marking engines and delivers the media to media output 110.

It is to be distinctly understood that system 100 is merely exemplary of one suitable multi-engine marking system and that any other multiple engine marking system could alternately be used. Other such systems can include, without limitation, systems having a plurality of marking engines, such as from two to twenty marking engines, for example; systems having multiple monochrome print engines (e.g., black only print engines), systems having multiple color print engines (e.g., cyan, magenta, yellow, black print engines), or systems having at least one of each.

System 100 also includes a supervisory controller 120 that is in communication with inputs 122 and 124 for receiving suitable signals and/or data therefrom. In one exemplary embodiment, input 122 is an image input device, such as a scanner, a camera or an electronic memory device, for example. In one exemplary embodiment, input 124 is in connection with a computer or computer network component, such as a print server, for example. In either case, inputs 122 and 124 are capable of delivering documents, other printing or marking images, and/or data or other suitable signals corresponding to the same for output by the marking engines. As such, it will be appreciated that any other suitable input device, system or connection can alternately or additionally be used. A user interface 126 is also in communication with controller 120 and, in one exemplary embodiment, is capable of sending communications to a user, such as through a display or output screen, for example, and receiving communications from a user, such as through a keypad or touch screen, for example.

It will be appreciated that marking engine 102, shown enlarged in FIG. 2, along with marking engines 104 and 106 shown in FIG. 1, can be of any suitable type, kind and/or configuration of marking engine. Additionally, it will be appreciated that the following discussion of marking engine 102 can be considered to be likewise descriptive of engines 104 and 106 of the exemplary embodiment shown and described herein. Furthermore, it will be appreciated that the marking engines include typical xerographic components, elements and actuators, and are generally operable in accordance with known xerographic principles, except where may be otherwise noted. Marking engine 102 includes a photoconductive element, such as a photoreceptive (PR) belt 128, for example, that is supported on conveying elements, such as rollers 130 and 130A, for example, for movement in the direction of arrow MVT. A motor 132 engages roller 130A (either directly or through a suitable transmission) and imparts rotational motion thereto to cause the movement of the PR belt.

The exemplary marking engine also includes a charging element, such as a scorotron wire 134 and a scorotron grid 136, for example, disposed along belt 128. An exposing apparatus 138, such as a raster output scanner, for example, is operatively associated with PR belt 128 downstream of grid 136. A developing apparatus 140 is also operatively associated with the PR belt downstream of the exposing apparatus. Additionally, a transfer corona 142 is shown in operative association with a sheet of print media SPM, such as paper, for example. A toner-removal device 144 is provided along PR belt 128, and a fusing device 146 is associated with each marking engine along marking path 118.

Supervisory controller 120 is also in communication with each engine through engine controllers 160, 162 and 164 along leads 166, 168 and 170, which are shown in respective association with marking engines 102, 104 and 106 in FIG. 1. Each engine controller is in communication with one or more engine actuators of the corresponding marking engine. In the exemplary embodiment shown in FIGS. 1 and 2, engine controller 160 is shown as being in communication with scorotron wire 134, scorotron grid 136, exposing apparatus 138 and developing apparatus 140. It will be appreciated, however, that each engine can have numerous actuators, devices, sensors and/or other components operatively associated therewith, and that any or all of these actuators, devices, sensors and/or other components can alternately, or additionally, be in communication with the associated engine controller.

Engine controller 160 is in communication with scorotron wire 134 through a lead 172. A charging-potential control signal corresponding to a charging potential level CHG is communicated therealong and is operative to establish the voltage potential along or across scorotron wire 134. Controller 160 is in communication with scorotron grid 136, exposing apparatus 138 and developing apparatus 140 through leads 174, 176 and 178, respectively. A grid-potential control signal corresponding to a charging grid level GRID is communicated along lead 174 and is operative to establish, control or otherwise adjust the voltage potential along or across scorotron grid 136. An exposure control signal EXP is communicated along lead 176 and is operative to establish, control or adjust the exposure level of exposing apparatus 138. A development control signal corresponding to a developer bias level BIAS is communicated along lead 178 and is operative to establish, control or adjust a voltage potential along or across developing apparatus 140.

Figure 3:
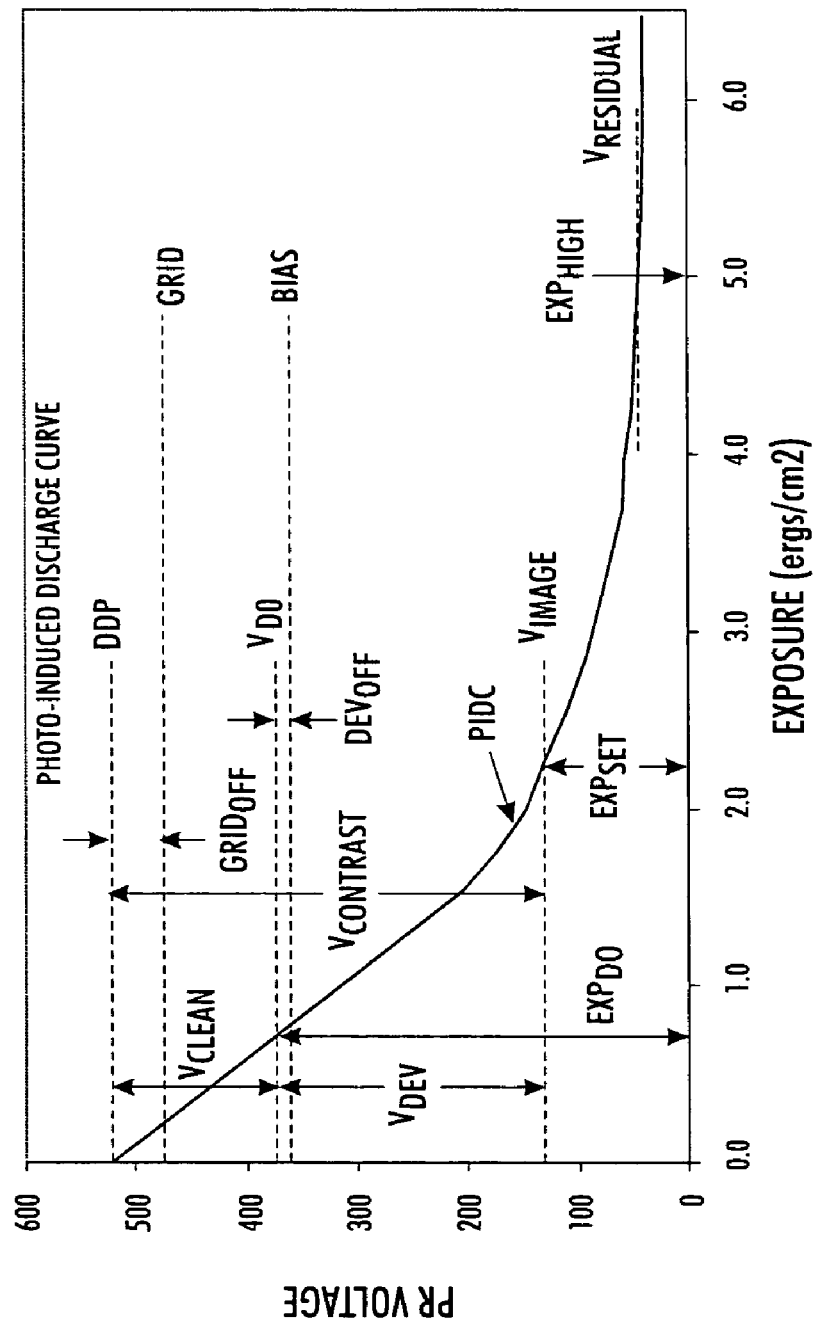
FIG. 3 is a graph illustrating a photo-induced discharge curve of a marking engine.

FIG. 3 illustrates a photo-induced discharge curve PIDC for one exemplary marking engine, though it will be appreciated that similar discharge curves could be constructed for other, different marking engines. Curve PIDC extends along an x-axis that is representative of exposure level and along a y-axis that is representative of photoreceptor (PR) voltage level. Generally, curve PIDC extends from a dark decay potential DDP at an exposure level of about zero (0) ergs/cm² and asymptotes to a residual photoreceptor voltage level $V_{RESIDUAL}$, which occurs at a high exposure level $EXP_{HIGH}$. For illustrative and discussion purposes, dark decay potential DDP is shown in FIG. 3 as being about 530V. Additionally, residual PR voltage level $V_{RESIDUAL}$ is shown as being about 50V and high exposure level $EXP_{HIGH}$ is shown as being about 5 ergs/cm².

A development field $V_{DEV}$ is established between lower and upper boundaries that respectively correspond to a full image development level $V_{IMAGE}$ and a development initialization level $V_{D0}$. Full image development level $V_{IMAGE}$ is established by an exposure level $EXP_{SET}$ in conjunction with curve PIDC. It will be appreciated that in the exemplary embodiment shown in FIGS. 1 and 2, the exposure level is established, controlled or adjusted by the exposure control signal communicated along lead 176. By selecting an exposure level as shown along the x-axis, it is possible to selectively establish a full image development level that corresponds to the intersection of the selected exposure level with curve PIDC. In one exemplary embodiment, exposure level $EXP_{SET}$ approximately corresponds to the exposure level at which there is full development of the photoreceptor without a significant level of overdevelopment. In FIG. 3, exposure level $EXP_{SET}$ is shown as being about 2.2 ergs/cm² and full image development level $V_{IMAGE}$ is shown as being about 130V.

By varying exposure level $EXP_{SET}$, full image development level $V_{IMAGE}$ and, thus, development field $V_{DEV}$, which is shown in FIG. 3 as being a difference of about 230V, can be selectively adjusted. Such adjustments to the full image development level and the development field can be used to selectively vary output conditions, such as solid area density, midtones and line darkness, for example. Exemplary embodiments of a system and method that include exposure adjustments are described in the '326 application referred to above. Additionally, an image contrast field $V_{CONTRAST}$ is established between a lower boundary of full image development field $V_{IMAGE}$ and an upper boundary of dark decay potential DDP. Thus, varying the exposure level can also be used to adjust other image output characteristics, such as image contrast, for example. In FIG. 3, image contrast field $V_{CONTRAST}$ is shown as being a difference of about 400V.

In one exemplary embodiment, development initialization level $V_{D0}$ is considered to be the voltage level at which development of a latent image on the photoreceptor begins. That is, the development initialization level is considered to be the voltage level at which only background development occurs. A background exposure level $EXP_{D0}$ is established by the intersection of development initialization level $V_{D0}$ and curve PIDC. Development initialization level $V_{D0}$ is shown in FIG. 3 as being about equal to developer bias level BIAS plus a developer offset $DEV_{OFF}$, and is generally considered to follow adjustments made to the developer bias level. It will be appreciated that in the exemplary embodiment shown in FIGS. 1 and 2, the developer bias level BIAS is established, controlled or adjusted by the development control signal communicated along lead 178. Though it is used in establishing an upper boundary of the development field that is associated with the attendant marking engine, the development initialization level itself is often difficult to determine directly and, as such, is typically an unknown value. Developer offset $DEV_{OFF}$ is a composite value used to compensate for a variety of known, unknown and/or otherwise unmeasured factors or variables, including factors related to the development sub-system, developer materials, drum-to-roll spacing and environment, for example. In FIG. 3, developer bias level BIAS is shown as being about 360V. Additionally, for illustrative and discussion purposes development initialization level $V_{D0}$ is shown in FIG. 3 as being about 380V and developer offset $DEV_{OFF}$ can, therefore, be determined to be about 20V in FIG. 3. Furthermore, background exposure level $EXP_{D0}$ is shown in FIG. 3 as being about 0.8 ergs/cm².

A cleaning field $V_{CLEAN}$ is shown established between a lower boundary of development initialization level $V_{D0}$ and an upper boundary of dark decay potential DDP. As discussed above, development initialization level $V_{D0}$ is often unknown due at least in part to developer offset $DEV_{OFF}$ being unknown. Dark decay potential DDP is shown in FIG. 3 as being the sum of a charging grid level GRID and a grid offset $GRID_{OFF}$. It will be appreciated that in the exemplary embodiment shown in FIGS. 1 and 2, the charging grid level GRID is established, controlled or adjusted by the grid-potential control signal communicated along lead 174. As with the developer offset discussed above, grid offset $GRID_{OFF}$ is a composite value used to compensate for a variety of known, unknown and/or otherwise unmeasured factors or variables, including factors such as those related to the charging wire or device, photoreceptor properties and environment, for example. Due at least in part to grid offset $GRID_{OFF}$ being unknown, dark decay potential DDP and, therefore, cleaning field $V_{CLEAN}$ are normally unknown as well. As indicated above, development initialization level $V_{D0}$ tends to follow adjustments made to developer bias level BIAS. Similarly, dark decay potential DDP tends to follow adjustments made to charging grid level GRID. In FIG. 3, cleaning field $V_{CLEAN}$ is shown as being a difference of about 150V. Additionally, charging grid level GRID is shown as being about 480V and $GRID_{OFF}$ is shown as being a difference of about 50V.

Having recognized the problems discussed above regarding multiple engines operating at different cleaning fields, it was discovered that measuring or otherwise determining specific values for one or more of the foregoing unknown variables can be avoided and that the cleaning fields of the marking engines can still be adjusted in a coordinated manner. Thus, the use of sensors (i.e., BTAC sensors) and the attendant control systems for determining a value of the cleaning field of marking engines can be minimized or eliminated. In one exemplary embodiment, this can be accomplished by adjusting one or more actuators of the marking engines based upon background levels developed on printed samples from the marking engines. By setting up the marking engines in a predetermined manner and then adjusting certain actuators such that the background levels are developed to be at about the same level, the cleaning fields can be suitably coordinated without the use of sensors and other devices.

Figure 4:
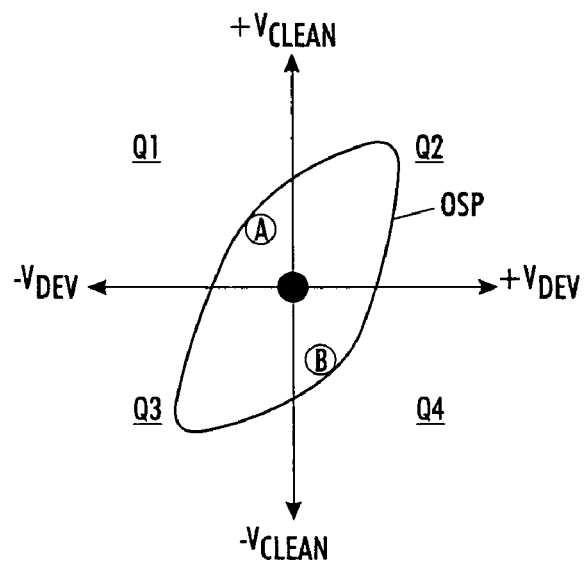
FIG. 4 is a latitude plot showing two marking engines operating within an output specification but apart from one another.
Figure 5:
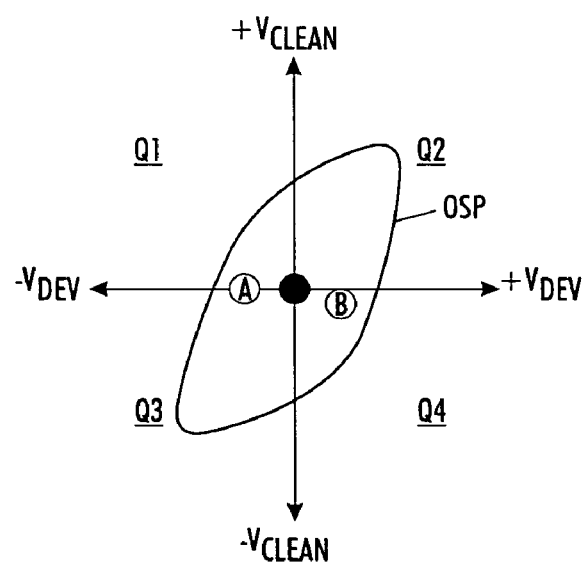
FIG. 5 is a latitude plot showing the two marking engines in FIG. 4 after an adjustment according to an exemplary embodiment herein.
Figure 6:
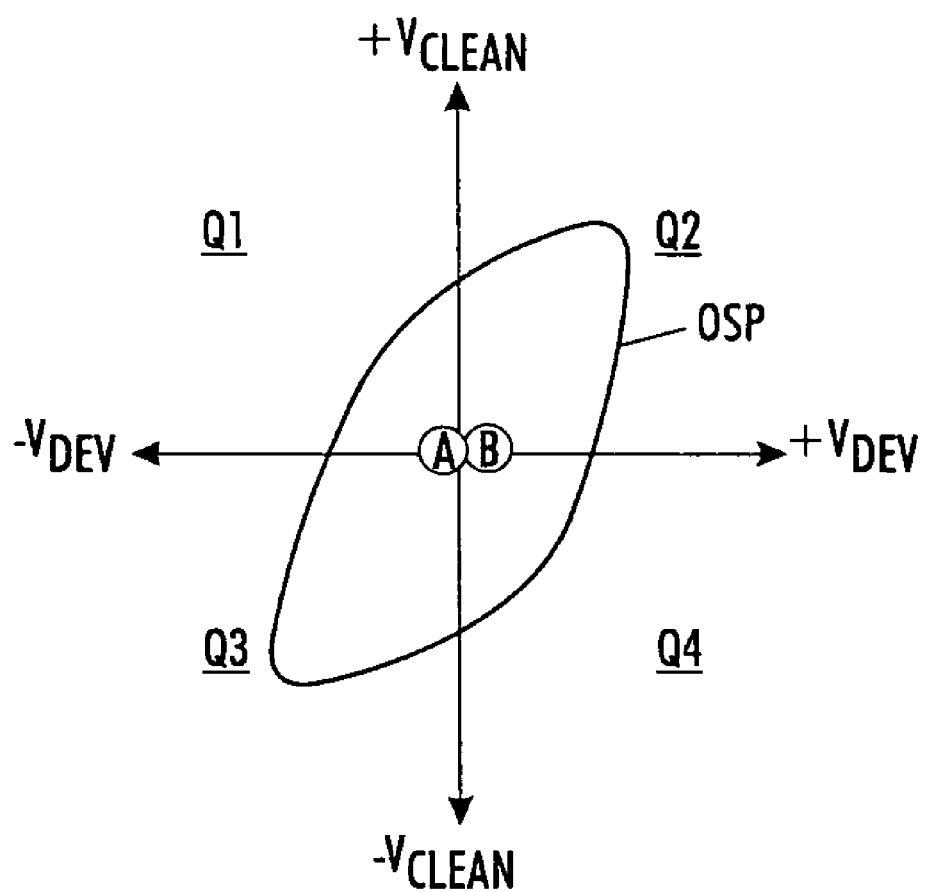
FIG. 6 is a latitude plot showing the two marking engines in FIG. 5 after a further adjustment.

FIGS. 4-6 illustrate an output specification area OSP within which a toner response curve (TRC) specification for a given type of marking engine is satisfied. The output specification area is centered on a pair of axes in which the vertical axis represents relative variation in cleaning field $V_{CLEAN}$ and the horizontal axis represents relative variation in development field $V_{DEV}$. The origin represents optimal cleaning field and development field setpoints for the marking engine.

The vertical and horizontal axes establish quadrants Q1, Q2, Q3 and Q4, and each quadrant can be considered to have somewhat different properties and characteristics. For example, quadrant Q1 represents a higher relative cleaning field and a lower relative development field. A marking engine operating in quadrant Q1 can output prints that have an overall lightness, and toner bead carryout can also occur due to the higher cleaning field. Quadrant Q2 represents a higher relative cleaning field and a higher relative development field. A marking engine operating in quadrant Q2 can output acceptable prints due to the higher development field compensating for the higher cleaning field. In some cases, limited linearity of curve PIDC can become problematic and bead carryout can also result due to the high cleaning field. Quadrant Q3 represents a lower relative cleaning field and a lower relative development field. A marking engine operating in quadrant Q3 can output prints of acceptable quality due to the lower development field compensating for the lower cleaning field. In some cases, however, low contrast levels can result in light solids. Quadrant Q4 represents a lower relative cleaning field and a higher relative development field. A marking engine operating in this quadrant can output prints having an overall darkness and can also result in background development.

In FIG. 4, marking engine A is shown in quadrant Q1 and marking engine B is shown in quadrant Q4. FIG. 5 shows each engine after a coordinated adjustment of the cleaning fields. In FIG. 4, the marking engines are shown as being approximately equally spaced from the horizontal axis. As such, upon making coordinated adjustment of the cleaning fields, the marking engines A and B remain disposed in approximately equal but opposite positions. FIG. 6 illustrates marking engines A and B after a further adjustment, such as an adjustment to the development field, for example. At least one exemplary embodiment of a system and method that include such development field adjustments are described in the '326 application.

Figure 7:
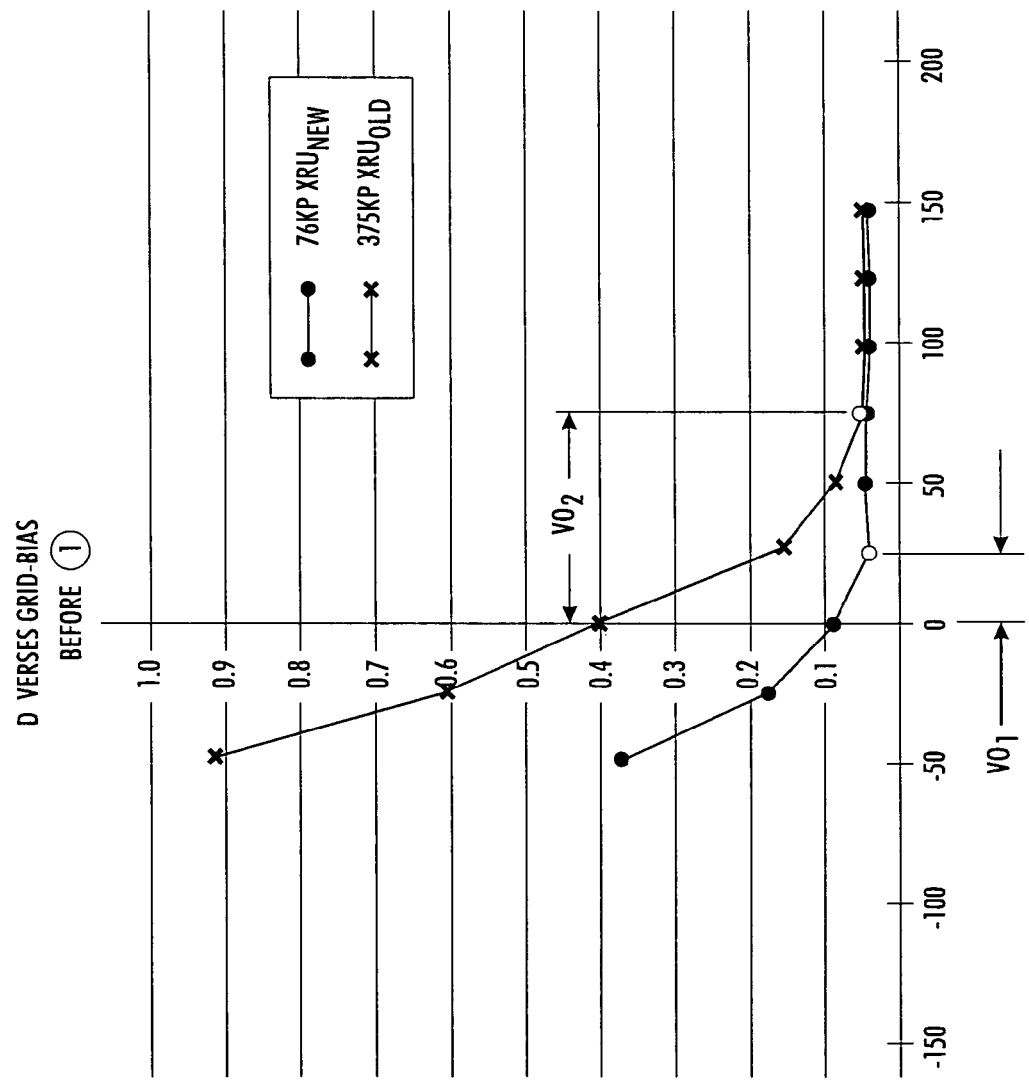
FIG. 7 is a graph illustrating exemplary curves of density versus charging grid level minus developer bias level for two marking engines prior to adjustment.
Figure 8:
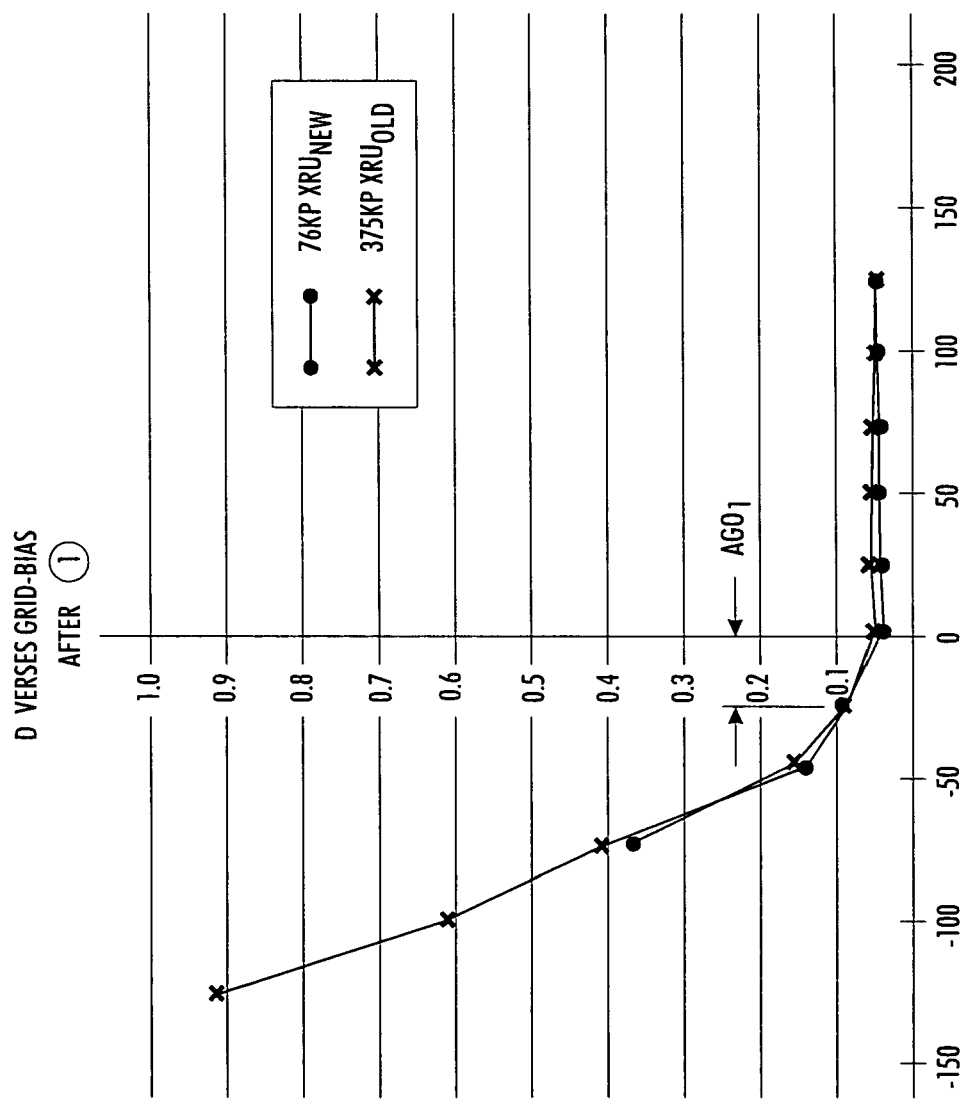
FIG. 8 is a graph illustrating exemplary curves of density versus charging grid level minus developer bias level for the two marking engines in FIG. 7 after adjustment.

FIGS. 7 and 8 illustrate exemplary curves of density (D) versus charging grid level minus developer bias level (G-B) for two marking engines respectively before and after a coordinated cleaning field adjustment. The curves in FIGS. 7 and 8 were established using test result data from a test performed using one marking engine with two different xerographic replaceable units. One of the xerographic replaceable units $XRU_{NEW}$ had produced approximately 76K prints and the other xerographic replaceable unit $XRU_{OLD}$ had produced approximately 375K prints. A single developer apparatus was used for both tests.

The test included producing a series of sample prints from each of the XRUs. For the test, the charging grid level for the marking engine was fixed at a predetermined setpoint, which was 250V. The developer bias level was then stepped through a series of predetermined setpoints and a print was produced for each corresponding condition. For this test, the developer bias level was stepped through setpoints of 100V, 125V, 150V, 175V, 200V, 225V, 250V, 275V and 300V. The background density of each print sample was then measured for each series of print samples. In the present test, an input scanner was used to determine the background density for the samples. The curves in FIG. 7 of background density versus charging grid level minus developer bias level were then established using the resulting test data.

Using a background density of approximately 0.05, estimated voltage offsets $VO_1$ and $VO_2$ are determined for the curves. As shown in FIG. 7, voltage offset $VO_1$ corresponds to $XRU_{NEW}$ and has a value of about 25V. Voltage offset $VO_2$ corresponds to $XRU_{OLD}$ and has a value of about 75V. The variations in response between the two XRUs can be at least partially attributed to differences in charging grid offset $GRID_{OFF}$ discussed above. By subtracting the voltage offsets from the charging grid value for the respective engines and re-plotting the curves, an example of a response between the two XRUs can be at least partly established, as shown in FIG. 8.

Figure 9:
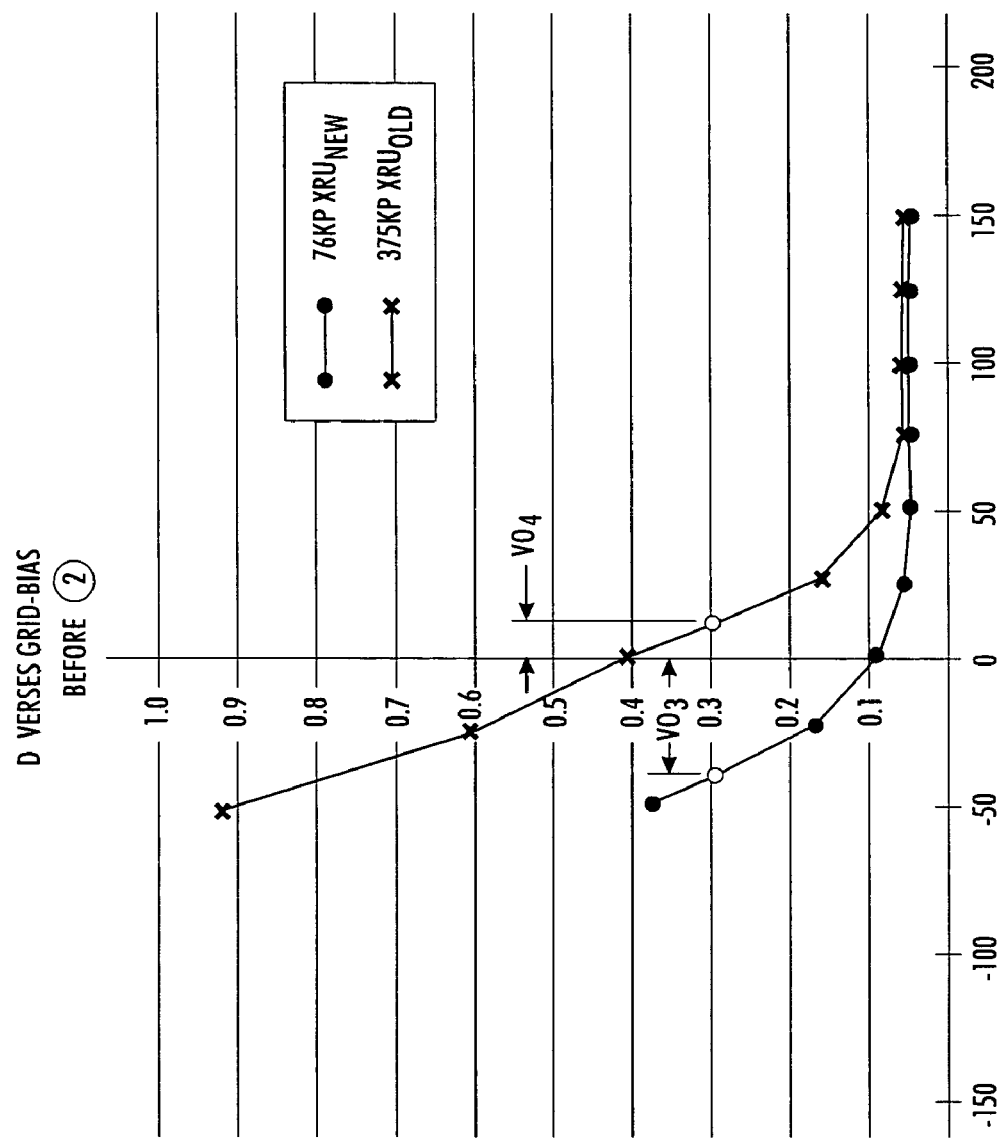
FIG. 9 is another graph illustrating exemplary curves of density versus charging grid level minus developer bias level for two marking engines prior to adjustment.
Figure 10:
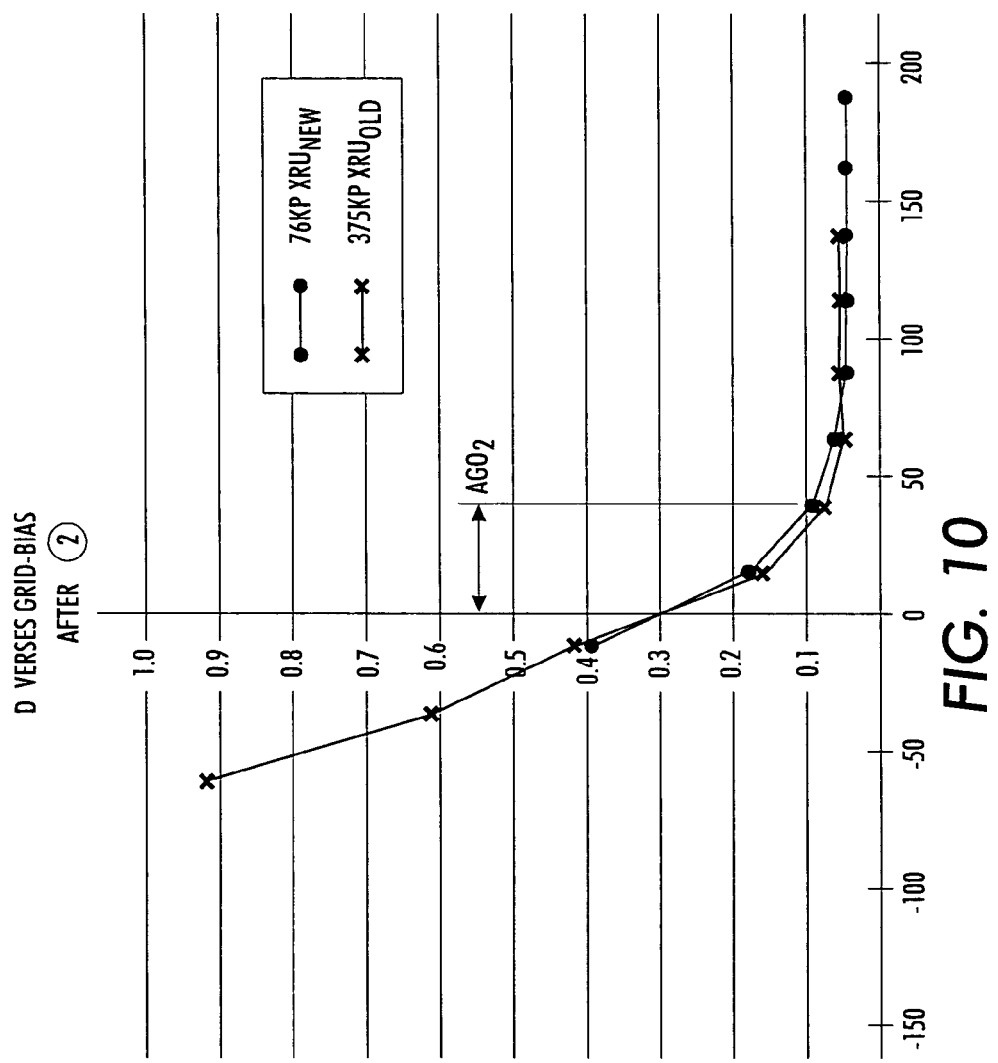
FIG. 10 is another graph illustrating exemplary curves of density versus charging grid level minus developer bias level for the two marking engines in FIG. 9 after adjustment.

It will be appreciated, however, that any suitable background density value can be used to determine the estimated voltage offsets. For example, FIGS. 9 and 10 again illustrate curves of density (D) versus charging grid level minus developer bias level (G-B) for the foregoing test data. However, rather than using a background density of about 0.05 to determine the voltage offsets, a background density value of about 0.3 is used. As shown in FIG. 9, voltage offset $VO_3$ corresponds to $XRU_{NEW}$ and has a value of about −50V. Voltage offset $VO_4$ corresponds to $XRU_{OLD}$ and has a value of about 15V. FIG. 10 then shows the two curves shifted by the corresponding voltage offsets to at least partially produce an example of a desired response between two marking engines.

Figure 11:
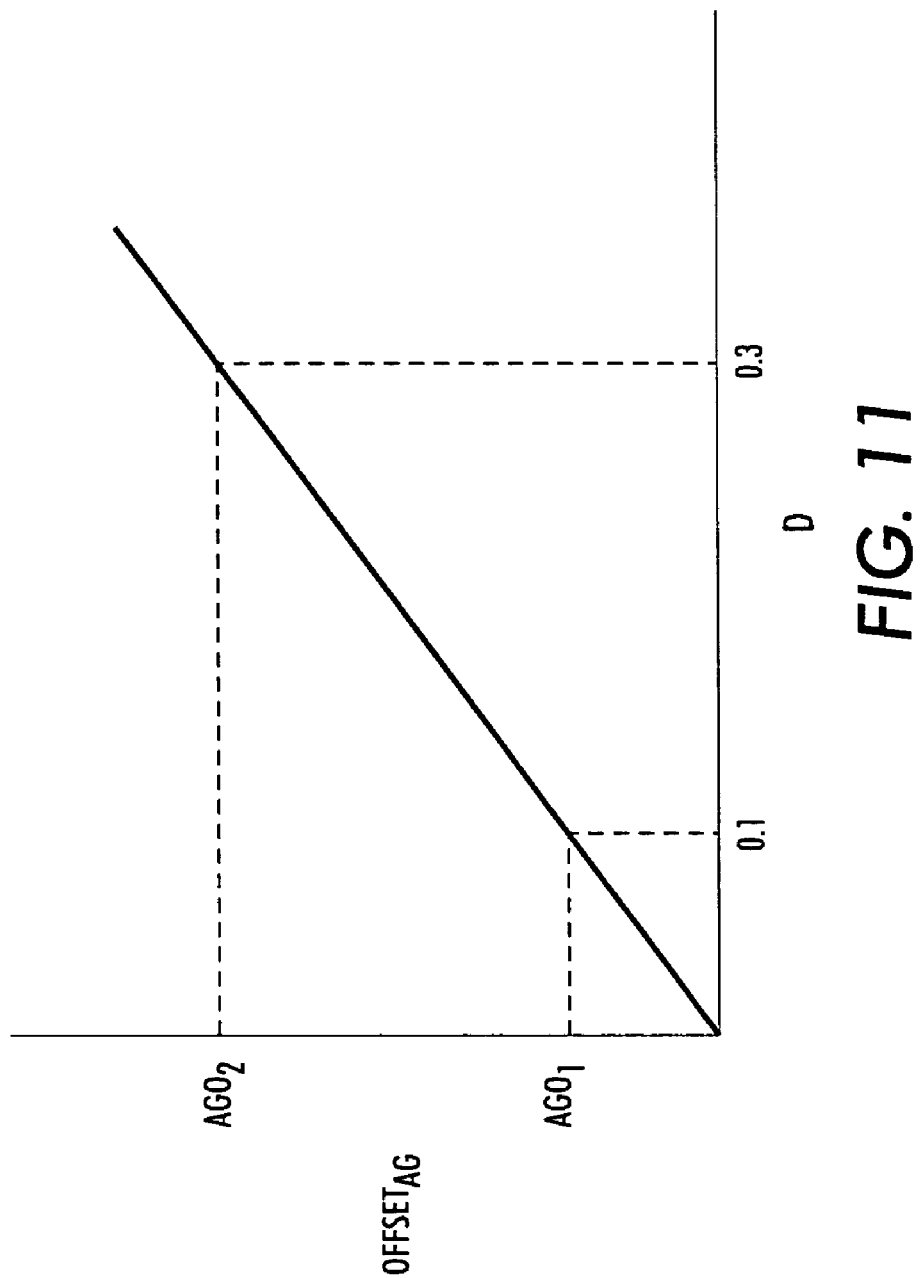
FIG. 11 is a graph of an exemplary curve of additional grid offset versus density.

The curves in FIGS. 8 and 10 are in substantially similar positions relative to one another after being shifted due to the corresponding voltage offsets. However, the resulting position of the two curves relative to the zero voltage (0V) position along the horizontal or G-B axis are clearly different. As a result, an additional grid offsets $AGO_1$ and $AGO_2$ are shown in FIGS. 8 and 10, respectively. A graph illustrating one exemplary curve of additional grid offset versus density is shown in FIG. 11, in which an additional grid offset $AGO_1$ is determined for background density of about 0.05 and an additional grid offset $AGO_2$ is determined for background density of about 0.3. The additional grid offsets $AGO_1$ and $AGO_2$ in FIGS. 8 and 10 are established from a background density of approximately 0.1 on the respective curves. However, it will be appreciated that other values could alternately be used and that a corresponding change in FIG. 11 could also be used. Inclusion of the additional grid offset in adjusting the curves in FIGS. 8 and 10 more fully represents an example of a desired response between two marking engines.

Figure 12:
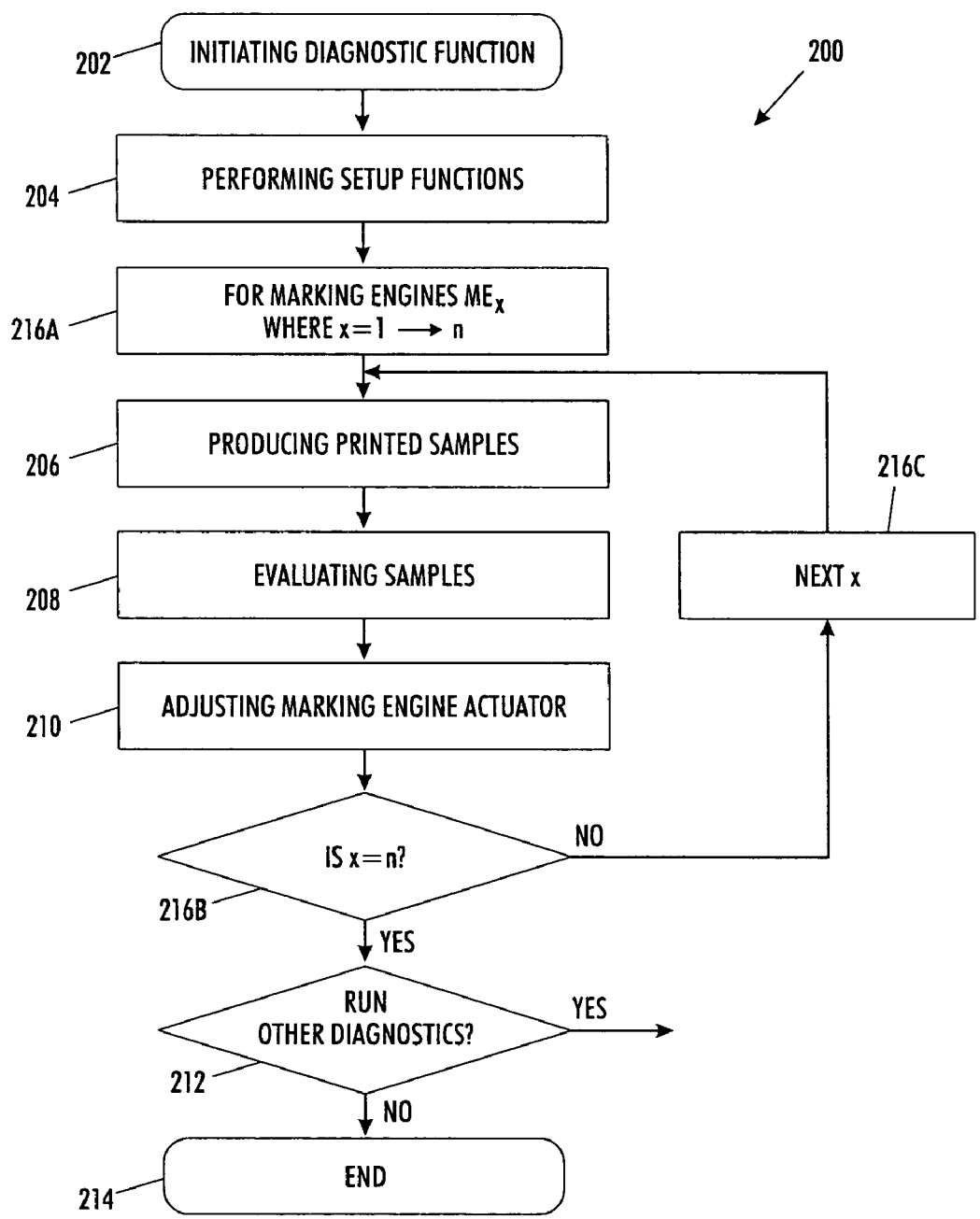
FIG. 12 is a flowchart illustrating one exemplary method of making adjustments to multiple marking engines.

One exemplary method 200 of adjusting a printing system is shown in FIG. 12, and includes a step 202 of initiating an adjustment or diagnostic function. Step 202 could be automatically initiated by the printing system, such as at a predetermined time interval or after a predetermined number of print cycles, for example. Alternately, step 202 could be initiated by a user or technician during a maintenance or repair procedure. Additionally, step 202 could also be initiated during the initial setup of the printing system, such as during manufacture or installation, for example. Furthermore, it may be desirable to select the specific marking engines of the system to be processed using method 200 during any particular cycle therethrough. For example, a marking system may include a first plurality of like marking engines (e.g., monochrome print engines) and a second, different plurality of like marking engines (e.g., multi-color print engines). Under certain circumstances and/or conditions, it may be desirable to adjust the two pluralities of marking engines on an individual basis.

Another step 204 includes performing setup functions for each of the marking engines of the printing system that are to be adjusted. Step 204 can include any suitable or desired actions, such as setting a parameter or actuator of the marking engines to a specific predetermined value and/or measuring a current characteristic of the printing system, associated component or supplies thereof, for example. Still another step 206 includes producing one or more printed samples having a printed background level using each of the marking engines that is to be adjusted. A further step 208 includes evaluating at least one printed sample produced from each marking engine that is to be adjusted, and still a further step 210 includes adjusting an actuator of one or more of the marking engines. In one exemplary embodiment, step 210 includes adjusting charging grid level GRID of one or more of the marking engines based upon the results of the evaluation in step 208.

An optional decision step 212 inquires as to whether to run one or more other diagnostics. For example, if step 212 is included and a YES determination is reached, one or more additional diagnostic procedures or functions can be performed, such as an exemplary embodiment shown and described in the '326 application, for example. Upon reaching a NO determination or, alternatively, if optional step 212 is not included, a step 214 can act to end the diagnostic procedure and returns the printing system to regular operation.

Method 200 can also include optional steps 216A, 216B and 216C that can be used to form a process loop used for cycling each marking engine that is to be adjusted through steps 206, 208 and 210 on an individual basis. That is, for each of the marking engines (1 to n) that are to be adjusted using method 200, the process loop established by steps 216A, 216B and 216C will be repeated and each marking engine will proceed one-at-a-time through steps 206, 208 and 210. Once the last marking engine has been cycled through the process loop formed by optional steps 216A, 216B and 216C, a YES determination is returned at decision step 216B and either optional step 212, if included, or ending step 214 can be performed.

Figure 13:
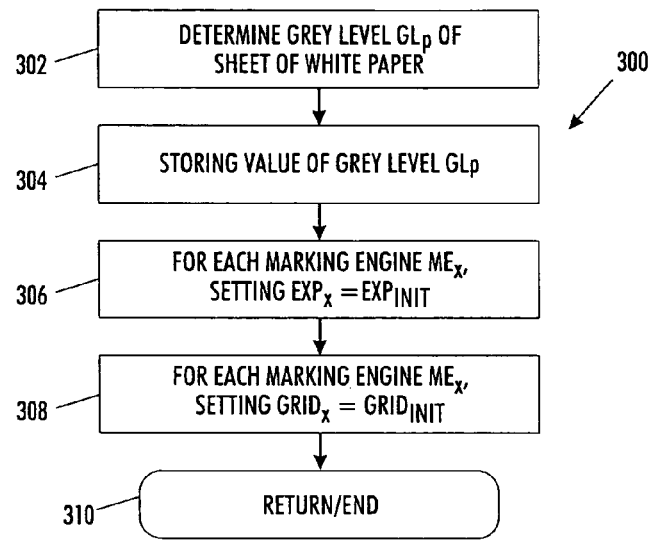
FIG. 13 is a flowchart illustrating one exemplary method of establishing setup parameters.

One exemplary embodiment of a method 300 of performing setup functions of a printing system is shown in FIG. 13 and includes a step 302 of determining a grey level $GL_P$ of a sample sheet of white paper. Generally, the term "grey level" as used herein is to be interpreted to refer to a measure of brightness of a sheet of paper. In one exemplary embodiment, the sample sheet can be scanned, such as by using a scanner (e.g., 122), for example, to quantify, measure or otherwise determine the grey level of the sheet. For example, using a scanner having an 8 bit measuring system, grey level can have a value from 0 to 255 or in a 10 bit system a value from 0 to 1024. Typically, a sheet of white paper will have a value toward a value of 255 or 1024, and the value will tend to decrease as background toner is developed and measured by the scanner. Preferably, the sample sheet will be substantially identical to the sheets of white paper that are expected to be used for producing sample background prints.

Another step 304 includes storing grey level $GL_P$ in a suitable manner, such as by storing a value or other data associated therewith in a non-volatile memory, for example. Still another step 306 includes setting exposure level $EXP_X$ of each marking engine $ME_X$ that is to be adjusted to a predetermined initial exposure level $EXP_{INIT}$. In one exemplary embodiment, the exposure level is associated with a raster output scanner and is set to a high exposure level, such as $EXP_{HIGH}$ of about 5.0 ergs/cm$^2$, for example. In another exemplary embodiment, the exposure is set to a nominal level, such as from about 1.5 ergs/cm$^2$ to about 2.5 ergs/cm$^2$, for example. However, it is to be understood that other suitable exposure levels can alternately be used.

A further step 308 includes setting charging grid level $GRID_X$ of each marking engine $ME_X$ that is to be adjusted to a predetermined initial grid level $GRID_{INIT}$. In one exemplary embodiment, the initial charging grid level can be set to about 250V. However, it will be understood that any other suitable charging grid level can alternately be used. Still a further step 310 can operate to end method 300 or, alternately, return the printing system to another diagnostic step, routine or method. For example, in one exemplary embodiment, step 204 of method 200, which is directed to performing setup functions, can include one or more steps of method 300. Thus, one or more steps of method 300 could operate as a subroutine of step 204 and step 310 could operate to return the subroutine to the primary routine, for example. It will be appreciated, though, that one or more additional or alternate steps or methods can also be included in performing step 204.

Figure 14:
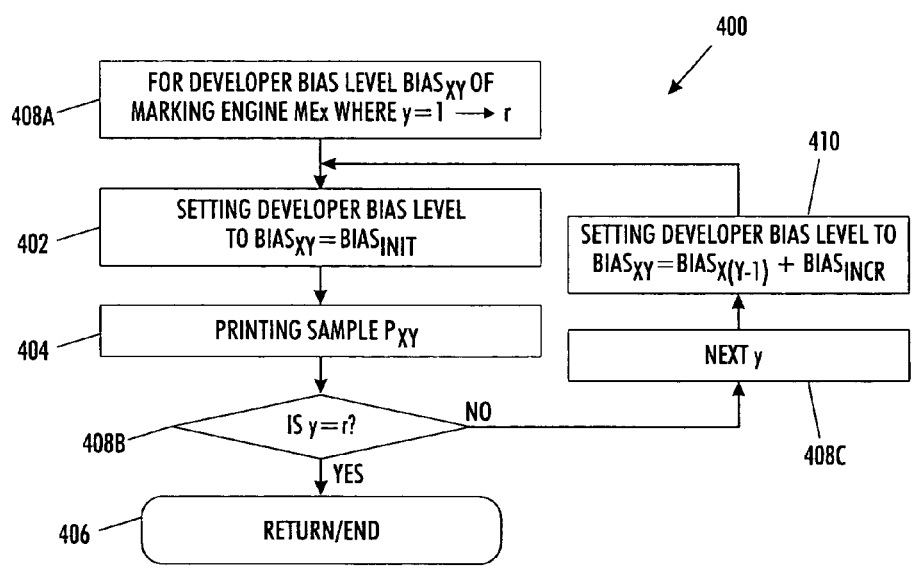
FIG. 14 is a flowchart illustrating one exemplary method of producing printed samples.

One exemplary embodiment of a method 400 of producing samples having a printed background is shown in FIG. 14 and includes a step 402 of setting developer bias $BIAS_X$ (shown as $BIAS_{XY}$ in FIG. 14) to a predetermined initial developer bias level $BIAS_{INIT}$ for each marking engine $ME_X$ that is to be adjusted. Another step 404 includes printing a sample background print $P_X$ (shown as $P_{XY}$ in FIG. 14) for each marking engine $ME_X$. A further step 406 can operate to end method 400 or, alternately, return the printing system to another diagnostic step, routine or method.

Method 400 can optionally include steps 408A, 408B, 408C and step 410. Steps 408A, 408B and 408C can be used to establish a process control loop for cycling a marking engine through numerous developer bias levels $BIAS_{XY}$, such as by using a counter y incremented from 1 to r developer bias levels, for example. Step 408A can establish initial variables of the process control loop, such as the number of increments r, and can also include establishing values, such as a bias increment value $BIAS_{INCR}$, for example. In one exemplary embodiment, initial developer bias level $BIAS_{INIT}$ is about 200V, bias increment $BIAS_{INCR}$ is about 25V and counter increment r is 8, though it will be understood that any other suitable value(s) can be used. Additionally, it will be appreciated that the bias increment level, if included, could alternately be established in any other suitable manner.

Step 408B is a decision step that determines whether the number of increments r has been reached. Step 408C advances counter y upon a NO determination at decision step 408B, and step 410 then increments the last development bias level $BIAS_{X(Y-1)}$ of the marking engine by the amount of bias increment value $BIAS_{INCR}$ to generate a new development bias level $BIAS_{XY}$. Step 404 is then repeated, producing an image sample $P_{XY}$. The process control loop is repeated until a YES determination is made at decision step 408B and ending step 406 is thereby reached.

It is to be understood that stepping the developer bias level through a range of values using a bias increment $BIAS_{INCR}$ is merely exemplary, and that developer bias level $BIAS_{XY}$ can be stepped through any suitable sequence or range of values, in either of a linear sequence or a non-linear sequence, in any suitable manner. For example, the sequence or range of values can be provided by using a numeric calculation or retrieving predetermined values from a look-up table.

In one exemplary embodiment, step 206 of method 200, which is directed to producing printed samples, can include one or more steps of method 400. Thus, in one exemplary embodiment, one or more steps of method 400 can operate as a subroutine of a step, such as step 206, for example. It will be appreciated, though, that one or more additional or alternate steps or methods can also be included in performing step 206.

Figure 15:
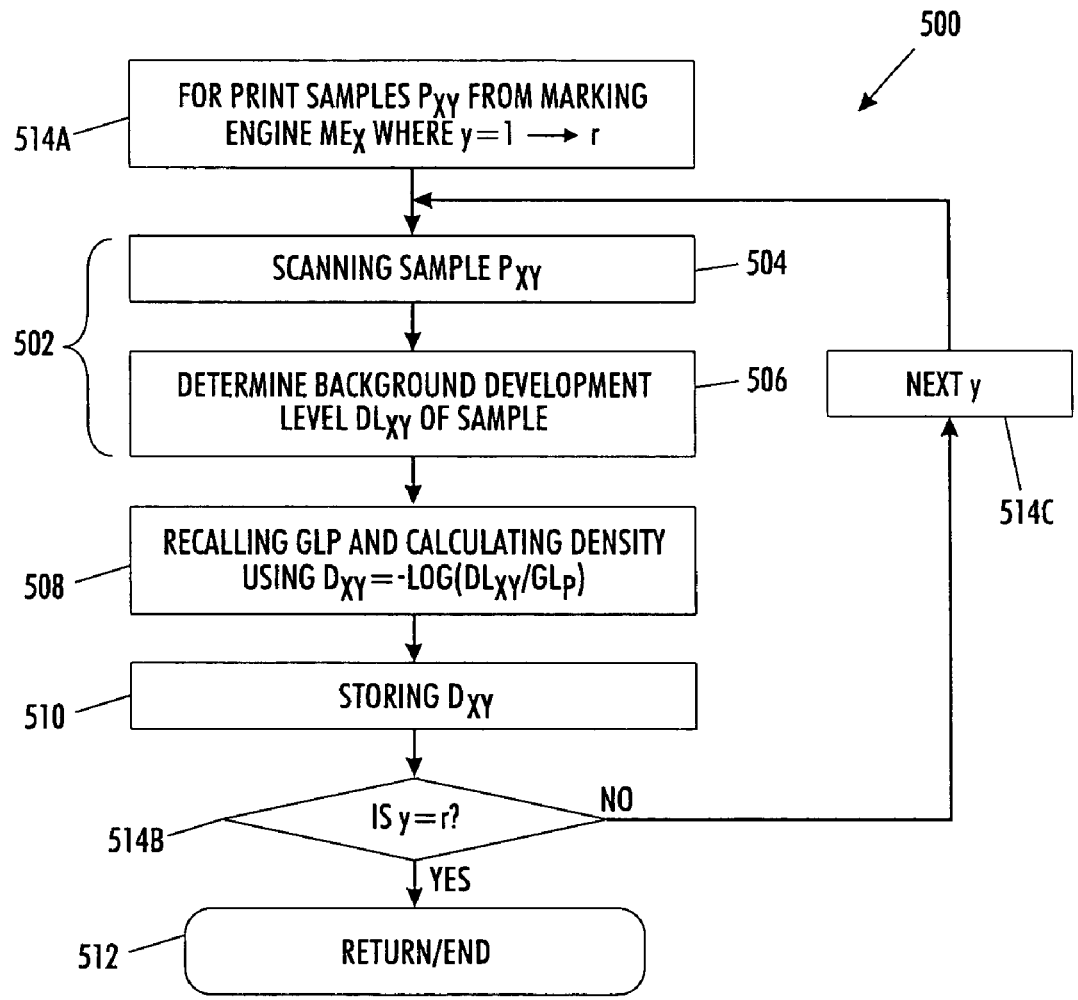
FIG. 15 is a flowchart illustrating one exemplary method of evaluating printed samples.

One exemplary method 500 of evaluating printed image samples from a marking engine is shown in FIG. 15 and includes a step 502 of determining a background density level of a printed sample from a marking engine. Step 502 can be performed in any suitable manner. For example, step 502 can include a step 504 of scanning a printed sample $P_X$ (shown as $P_{XY}$ in FIG. 15), such as by using a scanner (e.g., 122), for example, and outputting a signal or data stream corresponding to a background development level $DL_X$ (shown as $DL_{XY}$ in FIG. 15) of the printed sample. Additionally, step 502 can include a step 506 of receiving the scanner output and quantifying, measuring or otherwise determining a value corresponding to background development $DL_X$ for printed sample $P_X$ from the scanner or other output.

Another step 508 includes recalling an earlier determined and stored grey level $GL_P$ of a sheet of white paper and calculating a density value $D_X$ (shown as $CO_{XY}$ in FIG. 15) for the background printed on the sample. In one exemplary embodiment, the density value can be calculated using the equation $D_X = -\log(DL_X/GL_P)$. However, it will be appreciated that other suitable equations can alternately be used. Additionally, it will be appreciated that any other method of determining a corresponding density value could alternately be used. A further step 510 includes storing density value $D_X$ in a suitable manner, such as in a non-volatile memory, for example. Still a further step 512 can operate to end method 500 or, alternatively, return the printing system to another diagnostic step, routine or method.

Method 500 can optionally include steps 514A, 514B and 514C, which can be used to establish a process control loop for cycling a plurality of printed samples through steps 502, 508 and 510. In one exemplary embodiment, a counter y can be incremented from 1 to r printed samples, for example. Step 514A can establish the process control loop and any variables or settings thereof. Step 514B is a decision step that inquires as to whether or not each print sample has been evaluated. Once the last print sample has been evaluated, a YES determination is returned at decision step 514B, and return or ending step 512 can be performed.

In one exemplary embodiment, step 208 of method 200, which is directed to evaluating printed samples, can include one or more steps of method 500. It will be appreciated, though, that one or more additional or alternate steps or methods can also be included. Furthermore, in one exemplary embodiment method 500 is performed in a substantially automated manner using an automatic document feeder (ADF) associated with a suitable scanning device. That is, the printed samples can be placed in the ADF and each sample is scanned, the background development evaluated or quantified, and the corresponding density calculated and stored. The ADF continues feeding the printed samples until the last sample has been processed. However, it is to be understood that any other suitable arrangements can also be used.

Figure 16:
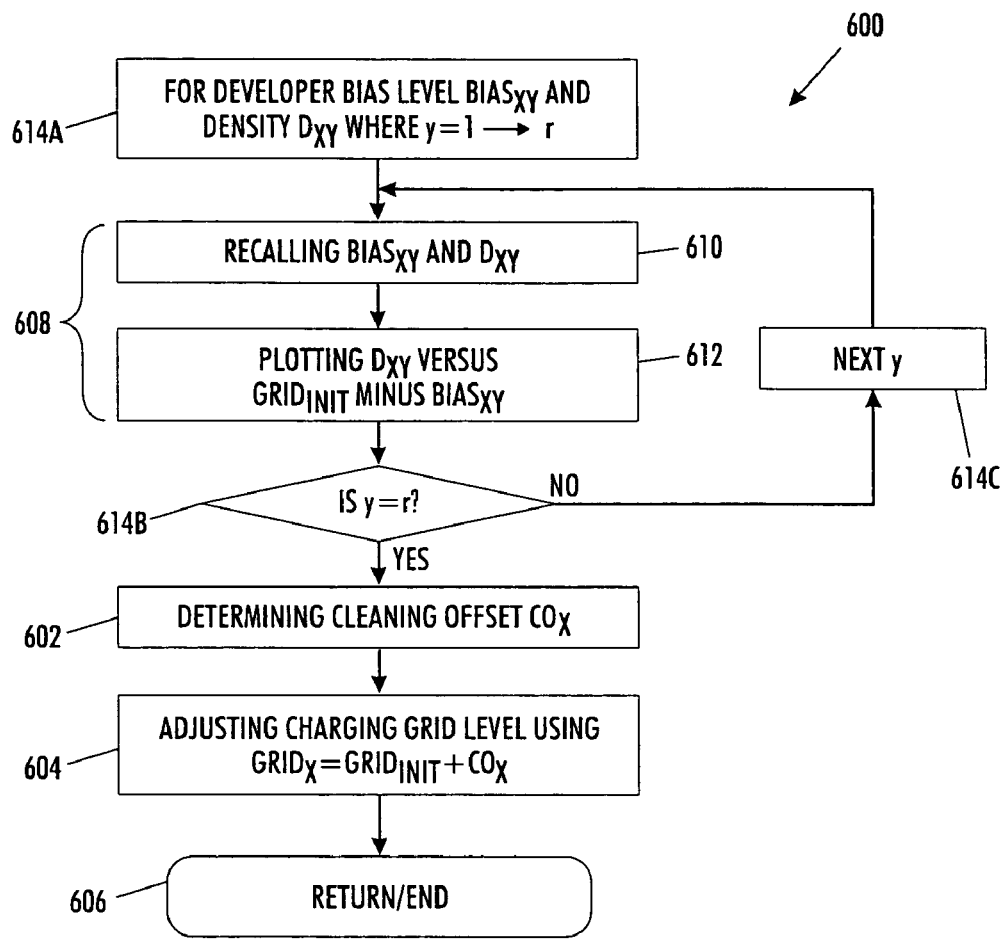
FIG. 16 is a flowchart illustrating one exemplary method of adjusting multiple marking engines.

One exemplary embodiment of a method 600 is shown in FIG. 16 and includes a step 602 of determining a cleaning offset $CO_X$ for each marking engine $ME_X$. Another step 604 includes adjusting charging grid level $GRID_X$ for each marking engine based upon the corresponding adjustment offset. In one exemplary embodiment, the charging grid level for a marking engine can be adjusted using the equation $GRID_X = GRID_{INIT} + CO_X$. A further step 606 can operate to end method 600 or, alternately, return the printing system to another diagnostic step, routine or method. For example, step 210 of method 200 can include one or more steps of method 600. It will be appreciated, however, that one or more additional or alternate steps or methods can also be included in step 210.

Step 602 can be performed in any suitable manner, such as by calculating or graphically determining the cleaning offset based upon the background density level of each corresponding marking engine. In one exemplary embodiment, method 600 can optionally include step 608 of establishing data or other information in any suitable form for determining cleaning offset $CO_X$ in step 602. In FIG. 16, step 608 is indicated as including a step 610 of recalling stored values or data for the developer bias level $BIAS_{XY}$ and a corresponding density level $D_{XY}$, such as from step 510 of method 500, for example. Step 608 can also optionally include a step 612 of plotting or otherwise graphically outputting a curve of density versus charging grid level minus developer bias level for each marking engine that is to be adjusted. Exemplary curves are shown in and discussed with regard to FIGS. 7-10. In one exemplary embodiment, the printing system could output or otherwise display these curves and an operator or technician could determine the cleaning offset therefrom. Alternately, the printing system could calculate the cleaning offset without generating a graphical output.

Additionally, method 600 can optionally include steps 614A, 614B and 614C, which can be used to establish a process control loop for recalling the values or data associated with the developer bias level and corresponding density level in step 610. Additionally, the process control loop can optionally be used for plotting or otherwise generating the graphical output of these values or data in step 612. In one exemplary embodiment, a counter y can be incremented from 1 to r printed samples, for example. Step 614A can establish the process control loop and any variables or settings thereof. Step 614B is a decision step that inquires as to whether or not all of the values and/or data has been recalled and/or plotted. Once the last value has been recalled and/or plotted, a YES determination is returned at decision step 614B, and return or ending step 606 can be performed.

One exemplary embodiment of a method of adjusting a printing system includes initiating an adjustment or diagnostic function, such as in step 202 of method 200, for example, which can be performed in any suitable manner, such as automatically or manually, for example. This exemplary embodiment of a method of adjusting a printing system can also include performing setup functions, such as in step 204, for example, that include setting the charging grid level for each marking engine to a predetermined initial level and setting the exposure level for each marking engine to a predetermined initial level. Determining and storing a grey level of a sheet of white paper can also be included. Once performing any setup functions is completed, the present exemplary embodiment can include producing printed samples from each marking engine that is to be adjusted. For example, each marking engine can be stepped or incremented through a series of actuator values, such as development bias values, for example, with a printed sample being produced at each setting. Thus, numerous printed samples can be produced by each marking engine as the same is stepped through the developer bias levels.

Having produced a collection of printed samples for a marking engine using different actuator values, the present exemplary embodiment can include evaluating the collection of samples, such as in step 208, for example. This can be performed in any suitable manner, such as by scanning the printed samples using a suitable scanning device, for example. One such suitable scanning device is a scanner (e.g., 122) having an associated automatic document feeder (ADF). The printed samples can be placed in the ADF, preferably in the order of production by the marking engine, and fed into the scanner by the ADF. The scanner can output a signal corresponding to the background development level of each respective printed sample, and the signals can be used to determine an associated background density level for each print sample, which can be stored as data in a suitable manner. This can be repeated for each group of printed samples produced, which correspond to each marking engine.

Once the collection of printed samples have been evaluated, the present exemplary embodiment can include adjusting an actuator of one or more of the marking engines, such as in step 210, for example. In the present exemplary embodiment, this can include determining a cleaning offset value, such as voltage offsets $VO_1$, $VO_2$, $VO_3$ and $VO_4$ in FIGS. 7 and 9, for example, and adjusting the charging grid level using the cleaning offset value. Once each marking engine has been adjusted, the cleaning fields thereof should be about equal to one another. Furthermore, an additional offset value can be determined, such as additional grid offsets $AGO_1$ and $AGO_2$ in FIGS. 8 and 10, for example, to adjust the marking engines toward an optimal cleaning field setpoint. Thereafter, any additional diagnostic or other procedures and/or adjustments can optionally be made.

Figure 17:
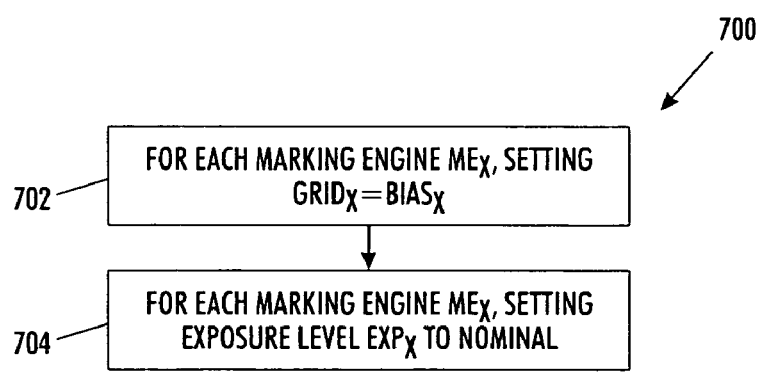
FIG. 17 is a flowchart illustrating another embodiment of establishing setup parameters.

An alternate embodiment of a method 700 of performing setup functions is shown in FIG. 17. Method 700 includes a step 702 of setting charging grid level $GRID_X$ substantially equal to developer bias level $BIAS_X$ for each marking engine $ME_X$ that is to be adjusted. Method 700 also includes a step 704 of setting exposure level $EXP_X$ to a nominal value for each of the marking engines to be adjusted. One example of a suitable range for exposure level $EXP_X$ is from about 1.5 ergs/cm² to about 2.5 ergs/cm². However, it will be appreciated that any suitable value can be used. Additionally, in one exemplary embodiment, step 204 of method 200 can include one or more steps of method 700. It will be appreciated, though, that one or more additional or alternate steps or methods can also be used.

Another exemplary embodiment of a method of adjusting a printing system, such as method 200 in FIG. 12, for example, can include initiating an adjustment or diagnostic function of the printing system, such as has been described above with regard to step 202, for example. This exemplary embodiment also includes performing any setup functions, such as in step 204, for example, prior to adjusting the printing system. In performing any setup functions, this exemplary embodiment can include setting the charging grid level substantially equal to the developer bias level, such as in step 702, for example, and setting the exposure level to a nominal level, such as in step 704, for example. In the present exemplary embodiment, these actions are preferably performed for each marking engine that is to be adjusted. Additionally, these actions can be performed automatically by the printing system or manually by an operator or technician.

Figure 18:
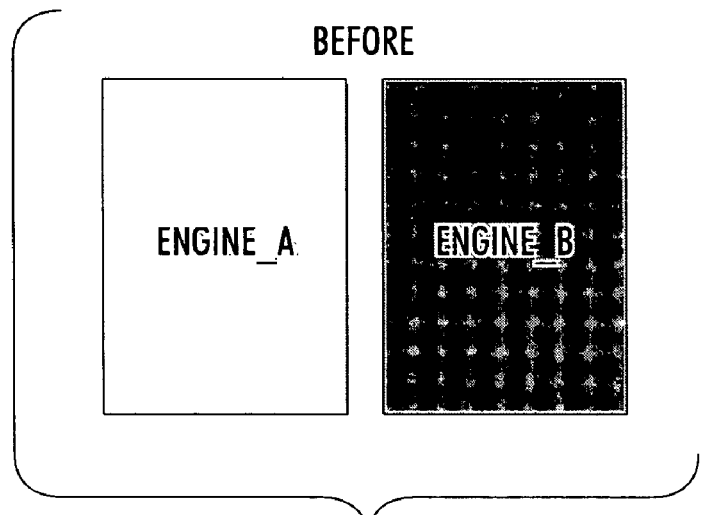
FIG. 18 is an illustrative representation of printed samples output by two different marking engines prior to adjustment; and, FIG. 19 is an illustrative representation of the printed samples in FIG. 18 after adjustment.

Once any setup functions have been performed, the present exemplary embodiment can include producing at least one printed sample using each marking engine. Exemplary representations of printed samples output by two different marking engines are shown in FIG. 18. It will be appreciated, however, that any suitable number of marking engines can be adjusted, such as from two to twenty marking engines, for example, and that a corresponding number of printed samples would be produced. Additionally, the sample from Engine A indicates that some background development has occurred. The sample from Engine B indicates that a significant level of background development has occurred, which is greater than that of Engine A. As such, the two samples have different levels of background development, which can be indicative of differences in the associated cleaning fields of the marking engines. It will be appreciated that if no background is developed on one or more of the printed samples, the operator or technician should reduce the charging grid level and exposure level proportionally until at least a slight background development occurs for the marking engine having no background development level. This can be achieved by adjusting the "Lighter/Darker" control present on typical printing systems, for example.

Once suitable printed samples have been produced, the present exemplary embodiment can include evaluating the samples, such as in step 208, for example, by comparing the printed samples for differences in the background development levels thereof. This can be performed in any suitable manner, such as by visually inspecting the printed samples for any differences. After determining whether any of the print samples have different background development levels, the present exemplary embodiment can include adjusting an actuator of a marking engine, such as in step 210, for example. In the present exemplary embodiment, the "Lighter/Darker" control can then be adjusted for each marking engine on an individual basis until the background development level of each engine is barely present, such as at a density level of from about 0.01 density units to about 0.05 density units, for example.

Figure 19:
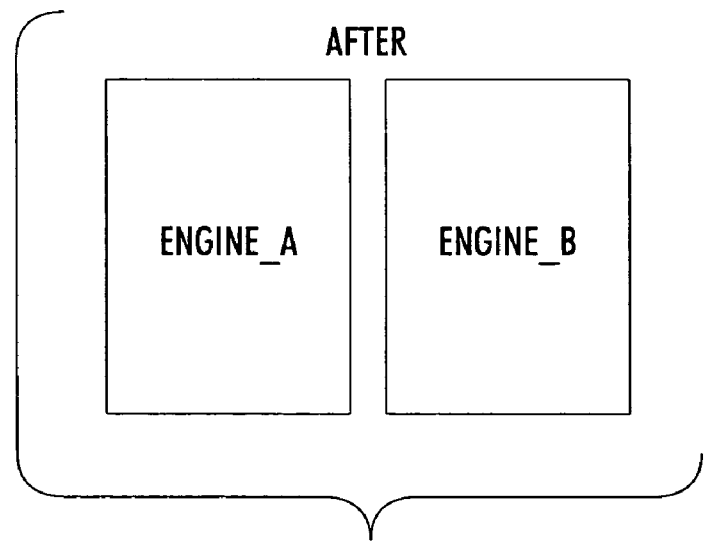

Once an adjustment has been made, the present exemplary embodiment can include printing a further print sample for each engine and evaluating the effectiveness of the adjustments. Further adjustments can continue to be made until a printing system having marking engines that output printed samples having substantially equal background development levels is achieved. At which point, the marking engines will have substantially equal cleaning fields as well. Exemplary representations of printed samples output by two different marking engines after such adjustments are shown in FIG. 19. It will be appreciated that Engine A will have been adjusted a lesser amount than Engine B, which had a greater level of background development prior to adjustment.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of adjusting a multi marking engine printing system without a densitometer, said adjustment being to improve engine to engine printing consistency, said method comprising:

initiating an adjustment of a printing system having a plurality of marking engines including at least respective first and second marking engines, each of said first and second marking engines including a respective photoreceptor and a respective charging grid, developer, and exposing apparatus operatively associated with said respective photoreceptor, said respective first and second marking engines capable of developing a respective predetermined latent image on said photoreceptor;

setting a respective charging grid voltage of said respective charging grids, a respective developer bias voltage of said developers and a respective exposure level of said exposing apparatuses to respective predetermined respective corresponding values for each of said respective first and second marking engines;

generating respective first and second print samples, each print sample having at least a portion suitable for evaluation of a background development level and corresponding to an area of said photoreceptor that is absent a predetermined latent image, using said respective first and second marking engines;

evaluating said respective print samples from said first and second marking engines to determine said respective background development levels; and, adjusting at least said charging grid voltage of at least one of said respective first and second marking engines based at least partially on said evaluation, said adjustment being of a magnitude and direction that are directed toward setting said printing system so that subsequently generated respective third and fourth test prints generated using said respective first and second marking engines would have respective visually apparent background levels that are of improved consistency with one another as compared to a consistency of said first and second test prints.

2. A method according to claim 1, wherein said background development level is visually apparent and evaluating said print samples includes visually comparing said print samples based upon said background development level thereof.

3. A method according to claim 1, wherein setting said charging grid voltages, said developer bias voltages and said exposure levels to predetermined values includes setting said charging grid voltages substantially equal to said developer bias voltages.

4. A method according to claim 3, wherein setting said charging grid voltages, said developer bias voltages and said exposure levels to predetermined values includes setting said exposure level to a nominal exposure level.

5. A method according to claim 4, wherein said nominal exposure level is from about 1.5 ergs/cm$^2$ to about 2.5 ergs/cm$^2$.

6. A method according to claim 1, wherein said action of evaluating includes determining a first cleaning offset of said first marking engine and a second cleaning offset of said second marking engine, wherein a cleaning offset is a voltage difference between a charging grid voltage and a developer bias voltage at which a selected level of background density is estimated to occur in a marking engine when other actuators of said marking engine are set at a predetermined set of values, and wherein said action of adjusting includes adjusting said charging grid level of said first marking engine by said first cleaning offset and adjusting said charging grid level of said second marking engine by said second cleaning offset.

7. A method according to claim 6, wherein adjusting at least said charging grid level of at least one of said first and second marking engines includes determining an additional grid offset for said charging grid voltages adjusted by said first and second cleaning offsets and adjusting each of said charging grid levels by said additional grid offset.

8. A method according to claim 1, wherein generating said respective first and second print samples includes:
generating a respective plurality of print samples using said first and second marking engines, wherein said charging grids and said developers of said first and second marking engines are set at respective charging grid and developer bias voltages such that each print sample of said plurality of print samples is generated at a different charging grid minus developer bias voltage difference.

9. A method according to claim 8, wherein evaluating said respective print samples includes:
determining said respective background development level for each respective print sample;
associating each determined respective background development level with said first or second marking engine used to generate said respective print from which said respective background development was determined and with said charging grid minus developer bias voltage difference at which said first or second marking engine was set when said respective print sample was generated;
selecting a background development level; and,
estimating, based on said background development levels associated with said respective first and second marking engines and said charging grid minus developer bias voltage differences, a first marking engine charging grid minus developer bias voltage difference associated with said selected background development level and a second marking engine charging grid minus developer bias voltage difference associated with said selected background development level;
wherein said adjusting at least said charging grid voltage of least one of said first and second marking engines includes:
selecting said first marking engine charging grid minus developer bias voltage difference to be a first cleaning offset;
selecting said second marking engine charging grid minus developer bias voltage difference to be a second cleaning offset; and
adjusting said charging grid level of said first marking engine by said first cleaning offset and adjusting said charging grid level of said second marking engine by said second cleaning offset.

10. A method of adjusting a printing system, said method comprising:
providing a printing system including a plurality of marking engines that each include a photoreceptor and first, second and third marking engine actuators operatively associated with said photoreceptor;
setting respective parameters of each of said first, second and third marking engine actuators of each marking engine of said plurality of marking engines to respective predetermined values suitable for generating printed samples having a visually apparent background density that corresponds to an area of said photoreceptor that is absent a predetermined latent image;
generating at least one printed sample having said visually apparent background density using at least one marking engine of said plurality of marking engines;
evaluating said background density of said at least one printed sample; and,
adjusting said first actuator of said at least one marking engine based at least partially on said evaluation of said background density of said printed samples, said adjusting being directed toward setting said at least one marking engine to subsequently generate a print having a visually apparent background at a target density level.

11. A method according to claim 10, wherein evaluating said background density of said at least one printed sample includes determining a density level thereof and evaluating said background density of said printed samples based at least partially on said density level.

12. A method according to claim 11, wherein determining a density level of said background density of said at least one printed sample includes determining a value of said background density and calculating said density level using said value.

13. A method according to claim 12, wherein determining a value of said background density includes scanning said printed sample to quantify said value.

14. A method according to claim 12, wherein in calculating said density level of said background density includes determining a grey level of an associated sample sheet prior to printing said printed sample on said associated sample sheet and calculating said density level using said sample sheet grey level.

15. A method according to claim 10, wherein evaluating said printed samples includes visually observing said background density of said printed samples.

16. A method according to claim 10, wherein said at least one printed sample is generated from one marking engine, and said method further comprises repeating generating printed samples having a background density for one or more additional marking engines.

17. A method according to claim 16 further comprising repeating evaluating a plurality of printed samples having a background density for one or more additional marking engines.

18. A method of adjusting a printing system to improve printed image consistency, uniformity and/or quality, said method comprising:
setting a charging grid level, a developer bias level and an exposure level of each of respective first and second marking engines to predetermined setpoints suitable for generating printed samples having at least a slight background development level corresponding to development of respective first and second photoreceptors of said first and second marking engines in respective areas thereof that are absent a predetermined latent image;

generating a printed sample using each of said first and second marking engines set at said predetermined setpoints, said printed samples each including at least a slight background density corresponding to said development of said first and second photoreceptors in an area thereof that is absent a predetermined latent image;

evaluating each of said printed samples based at least partially on said background densities thereof; and, adjusting at least one actuator having an influence on at least one of a respective first and second cleaning field of said respective first and second marking engines in a manner to bring said first and second cleaning fields closer in value, said adjusting being based at least in part on said evaluation of said background density of said printed samples.

19. A method according to claim 18, wherein adjusting at least one actuator includes adjusting an actuator having an influence to move said first cleaning field toward a predetermined setpoint and adjusting an actuator having an influence to move said second cleaning fields toward said predetermined setpoint.

20. A method according to claim 18, wherein adjusting at least one actuator includes adjusting at least one of said charging grid level or said developer bias level of at least one of said first and second marking engines.

21. A method according to claim 18 further comprising:
generating a second printed sample using each of said first and second marking engines;
evaluating each of said second printed samples based at least partially on said background densities thereof; and,
adjusting at least one actuator having an influence on at least one of a respective first and second cleaning field of said respective first and second marking engines in a manner to bring said first and second cleaning fields closer in value, said adjusting being based at least in part on said evaluation of said background density of said second printed samples, if said evaluation indicates such adjustment is possible.

22. A method according to claim 18, wherein evaluating each of said printed samples includes visually comparing said printed samples based at least partially on said background densities thereof.

* * * * *